(12) United States Patent
Tsukamoto

(10) Patent No.: US 10,489,091 B2
(45) Date of Patent: Nov. 26, 2019

(54) IMAGE FORMING APPARATUS, INSPECTION DEVICE, AND INSPECTION PROGRAM

(71) Applicant: KONICA MINOLTA, INC., Chiyoda-ku, Tokyo (JP)

(72) Inventor: Yasumasa Tsukamoto, Hino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 16/157,527

(22) Filed: Oct. 11, 2018

(65) Prior Publication Data

US 2019/0121586 A1    Apr. 25, 2019

(30) Foreign Application Priority Data

Oct. 20, 2017   (JP) .................................. 2017-203718

(51) Int. Cl.
*G06F 11/00* (2006.01)
*G06F 3/12* (2006.01)

(52) U.S. Cl.
CPC .......... *G06F 3/1219* (2013.01); *G06F 3/1234* (2013.01); *G06F 3/1284* (2013.01)

(58) Field of Classification Search
CPC .............. G06F 3/1234; G03G 15/6523; H04N 1/00567
USPC ..................... 358/3.26, 1.18; 399/385, 15, 19
See application file for complete search history.

(56) References Cited

U.S. PATENT DOCUMENTS

| | | | | |
|---|---|---|---|---|
| 2008/0237963 | A1* | 10/2008 | Reichhart | G06F 17/217 270/52.01 |
| 2013/0176588 | A1* | 7/2013 | Oi | G06K 15/02 358/1.14 |
| 2014/0293297 | A1* | 10/2014 | Nagahara | G06K 15/024 358/1.6 |
| 2015/0078627 | A1* | 3/2015 | Fukase | G06T 7/001 382/112 |

FOREIGN PATENT DOCUMENTS

JP    2009-025374 A    2/2009

* cited by examiner

*Primary Examiner* — Jamares Q Washington
(74) *Attorney, Agent, or Firm* — Buchanan Ingersoll & Rooney PC

(57) ABSTRACT

An image forming apparatus includes: a hardware processor; an image former that outputs a printed sheet obtained by forming a plurality of imposed images on a sheet in response to a command from the hardware processor; and an image reader that reads the printed sheet and outputs read images according to a command from the hardware processor, wherein the hardware processor performs, according to a command from the hardware processor, an inspection process of comparing a reference image included in a predetermined inspection unit with an image selected from the read image on the basis of the unit inspection, and obtains an inspection result in which the image selected from the read images which is matched with the reference image is determined to be a normal image and the image selected from the read images which is not matched with the reference image is determined to be an abnormal image.

16 Claims, 23 Drawing Sheets

| WHETHER IMAGE INSPECTION IS PERFORMED | DESIGNATE WHETHER ABNORMALITY IS ABSENT IN PRINTED SHEET OR WHETHER TO PERFORM INSPECTION |
|---|---|
| WHETHER CUTTING IS PERFORMED | DESIGNATE WHETHER TO CUT PRINTED SHEET |
| NUMBER OF DIVISIONS IN MAIN SCANNING DIRECTION | NUMBER OF DIVISIONS IN MAIN SCANNING DIRECTION AT TIME OF CUTTING |
| NUMBER OF DIVISIONS IN SUB-SCANNING DIRECTION | NUMBER OF DIVISIONS IN SUB-SCANNING DIRECTION AT TIME OF CUTTING |

T2

| NUMBER OF IMPOSITIONS IN MAIN SCANNING DIRECTION | NUMBER OF IMAGES IMPOSED IN MAIN SCANNING DIRECTION |
|---|---|
| NUMBER OF IMPOSITIONS IN SUB-SCANNING DIRECTION | NUMBER OF IMAGES IMPOSED IN SUB-SCANNING DIRECTION |

T3

|  | CUTTING IS PERFORMED | CUTTING IS NOT PERFORMED |
|---|---|---|
| IMAGE INSPECTION IS PERFORMED | IMAGE INSPECTION IS PERFORMED IN DESIGNATED UNIT OF CUTTING | IMAGE INSPECTION IS PERFORMED ON ENTIRE SHEET |
| IMAGE INSPECTION IS NOT PERFORMED | IMAGE INSPECTION IS NOT PERFORMED | IMAGE INSPECTION IS NOT PERFORMED |

| FIRST COPY | 1 | SECOND COPY | 2 | THIRD COPY | 0 |
|---|---|---|---|---|---|
| FOURTH COPY | 0 | FIFTH COPY | 1 | SIXTH COPY | 2 |
| SEVENTH COPY | 2 | EIGHTH COPY | 0 | NINTH COPY | 1 |

| FIRST COPY | 1 | SECOND COPY | 2 | THIRD COPY | 0 |
|---|---|---|---|---|---|
| FOURTH COPY | 0 | FIFTH COPY | 1 | SIXTH COPY | 2 |
| SEVENTH COPY | 3 | EIGHTH COPY | 0 | NINTH COPY | 1 |

FIG. 15A

| FIRST PAGE | 1 | SECOND PAGE | 2 | THIRD PAGE | 0 |
|---|---|---|---|---|---|
| FOURTH PAGE | 0 | FIFTH PAGE | 1 | SIXTH PAGE | 1 |

FIG. 15B

FIRST PAGE

| a1 | a2 | a3 | a4 |
|---|---|---|---|
| a5 | b1 | b2 | b3 |

SECOND PAGE

| b4 | b5 | c1 | c2 |
|---|---|---|---|
| c3 | c4 | c5 | d1 |

THIRD PAGE

| d2 | d3 | d4 | d5 |
|---|---|---|---|
| e1 | e2 | e3 | e4 |

FOURTH PAGE

| e5 | f1 | f2 | f3 |
|---|---|---|---|
| f4 | f5 | g1 | g2 |

FIFTH PAGE

| g3 | g4 | g5 | h1 |
|---|---|---|---|
| h2 | h3 | i1 | i2 |

SIXTH PAGE

| i3 | i4 | i5 | j1 |
|---|---|---|---|
| j2 | j3 | | |

| FIRST PAGE | 2 | SECOND PAGE | 2 | THIRD PAGE | 0 |
| --- | --- | --- | --- | --- | --- |
| FOURTH PAGE | 0 | FIFTH PAGE | 1 | SIXTH PAGE | 1 |

FIRST PAGE OF RECOVERY PRINTING

FIRST PAGE OF RECOVERY PRINTING

SECOND PAGE OF RECOVERY PRINTING

FIRST SHEET OF RECOVERY PRINTING

SECOND SHEET OF RECOVERY PRINTING

IMAGE FORMING APPARATUS, INSPECTION DEVICE, AND INSPECTION PROGRAM

The entire disclosure of Japanese patent Application No. 2017-203718, filed on Oct. 20, 2017, is incorporated herein by reference in its entirety.

BACKGROUND

Technological Field

The present invention relates to an image forming apparatus, an inspection device, and an inspection program.

Description of the Related Art

In the related art, it is determined whether an image formation defect (hereinafter, referred to as "abnormality"), such as the formation of an inappropriate image, contamination, or the positional deviation of an image, has occurred in the sheet on which an image has been formed (printed) (printed sheet) by an image forming apparatus on the basis of print settings. Whether an abnormal image is present in the printed sheet is automatically determined by an inspection device or is visually determined by a user. Then, a sheet that is determined to be partially abnormal (hereinafter, referred to as a "waste sheet") is removed. JP 2009-25374 A discloses a technique for determining the waste sheet.

JP 2009-25374 A discloses a technique which determines whether an image formation defect occurs on the basis of data read from both surfaces and image data.

The print settings include a repeat mode and an aggregation mode. In the repeat mode, a plurality of same images is imposed on one sheet and the sheet is printed. In the aggregation mode, a plurality of different images is imposed on one sheet and the sheet is printed. In both the repeat mode and the aggregation mode, the printed sheet having the imposed images formed thereon is cut into predetermined units (each plane or each group of a plurality of images). Next, the repeat mode will be described with reference to FIG. 1 and the aggregation mode will be described with reference to FIG. 2.

FIG. 1 is a diagram illustrating an example of abnormality occurring in a sheet printed in the repeat mode and a sheet subjected to recovery printing.

An example of the sheet on which images of eight planes have been laid out and printed in the repeat mode is illustrated on the left side of FIG. 1. It is assumed that abnormality X1, such as contamination, has been detected from the second plane from the lower left side of the sheet by image inspection. In the related art, it is determined whether the abnormality X1 is present in the entire sheet. Therefore, in a case in which the abnormality X1 has been detected from even one plane in the entire printed sheet, the sheet is processed as the waste sheet and recovery printing is performed.

An example of the sheet subjected to recovery printing in the repeat mode is illustrated on the right side of FIG. 1. The abnormality X1 is detected from only one plane in the sheet illustrated on the left side of FIG. 1. Therefore, a printed sheet corresponding to the first plane from the upper left side of the sheet illustrated on the right side of FIG. 1 is sufficient for recovery printing. However, since the recovery printing is performed on each sheet, the printing of images corresponding to seven planes is additionally performed as represented by a frame surrounded by a one-dot chain line.

Therefore, supplies including toner used in the image forming apparatus are additionally consumed. In a case in which there are a large number of documents, the number of sheets subjected to recovery printing increases, which causes a waste of sheet.

For example, in a case of printing ten copies of a printed sheet including a sheet on which eight planes have been printed, it is assumed that the abnormality X1 is present in the same portion of each sheet. In this case, the number of normally printed planes in each sheet is 7. Therefore, 70 (=7×10) images are normally printed. The number of sheets determined to be the waste sheets by the inspection device or the user is 10. Therefore, the image forming apparatus performs recovery printing for 10 sheets.

However, although the number of sheets determined to be the waste sheets is 10, the number of planes having the abnormality X1 is 10. That is, the number of insufficient planes is calculated by subtracting the number of planes having the abnormality X1 from the number of printed planes and is 10 (=8×10−70). Therefore, for recovery printing in the repeat mode, it is sufficient to print two sheets that are required in a case in which the same images corresponding to 10 planes. However, in the recovery printing according to the related art, since 10 sheets are printed, eight sheets are wasted and supplies are consumed.

FIG. 2 is a diagram illustrating an example of abnormality occurring in a sheet printed in the aggregation mode and a sheet subjected to recovery printing.

An example of the sheet on which images of eight planes have been laid out and printed in the aggregation mode is illustrated on the left side of FIG. 2. It is assumed that the abnormality X1, such as contamination, has been detected from the second plane from the lower left side of the sheet by image inspection. In the related art, it is determined whether the abnormality X1 is present in the entire sheet. Therefore, in a case in which the abnormality X1 has been detected from even one plane in the entire printed sheet, the sheet is processed as the waste sheet and recovery printing is performed.

An example of the sheet subjected to recovery printing in the aggregation mode is illustrated on the right side of FIG. 2. Only one printed sheet on which "f1f2f3f4f5" has been printed is required in the sheet subjected to recovery printing. However, since the recovery printing is performed on each sheet, the printing of seven planes other than "f1f2f3f4f5" is additionally performed as represented by a frame surrounded by a one-dot chain line. Therefore, supplies including toner used in the image forming apparatus are additionally consumed. In a case in which there are a large number of documents, the number of sheets subjected to recovery printing increases, which causes a waste of sheet.

Similarly to the recovery printing in the repeat mode illustrated in FIG. 1, for recovery printing in the aggregation mode, it is sufficient to print two sheets that are required in a case in which images corresponding to 10 planes are printed. However, in the recovery printing according to the related art, since 10 sheets are printed, eight sheets are wasted and supplies are consumed.

In the repeat mode or the aggregation mode, the printed sheet is cut and is used as a plurality of printed sheets. Therefore, the plane without abnormality, such as contamination, is desired to be used. However, in the related art, in a case in which a contaminant is attached to one plane of a sheet, the entire sheet is processed as the waste sheet even though other planes of the sheet have been normally printed. Then, recovery printing is automatically performed. As a result, the normal planes more than necessary are printed, which causes a waste of sheet.

SUMMARY

The present invention has been made in view of the above-mentioned problems, and an object of the present invention is to provide a technique that can effectively use a sheet including a plane in which abnormality has occurred.

To achieve the abovementioned object, according to an aspect of the present invention, an image forming apparatus reflecting one aspect of the present invention comprises: a hardware processor; an image former that outputs a printed sheet obtained by forming a plurality of imposed images on a sheet in response to a command from the hardware processor; and an image reader that reads the printed sheet and outputs read images in response to a command from the hardware processor, wherein the hardware processor performs, in response to a command from the hardware processor, an inspection process of comparing a reference image included in a predetermined unit of inspection with an image selected from the read image on the basis of the unit of inspection, and obtains an inspection result in which the image selected from the read images which is matched with the reference image is determined to be a normal image and the image selected from the read images which is not matched with the reference image is determined to be an abnormal image.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 9 is a diagram illustrating an example of the configuration of job information according to the embodiment of the present invention;

FIGS. 15A and 15B are diagrams for calculating the number of sheets required for recovery printing in a case in which abnormality has been detected from the sheet printed in the aggregation mode in the embodiment of the present invention;

DETAILED DESCRIPTION OF EMBODIMENTS

Figure 1:
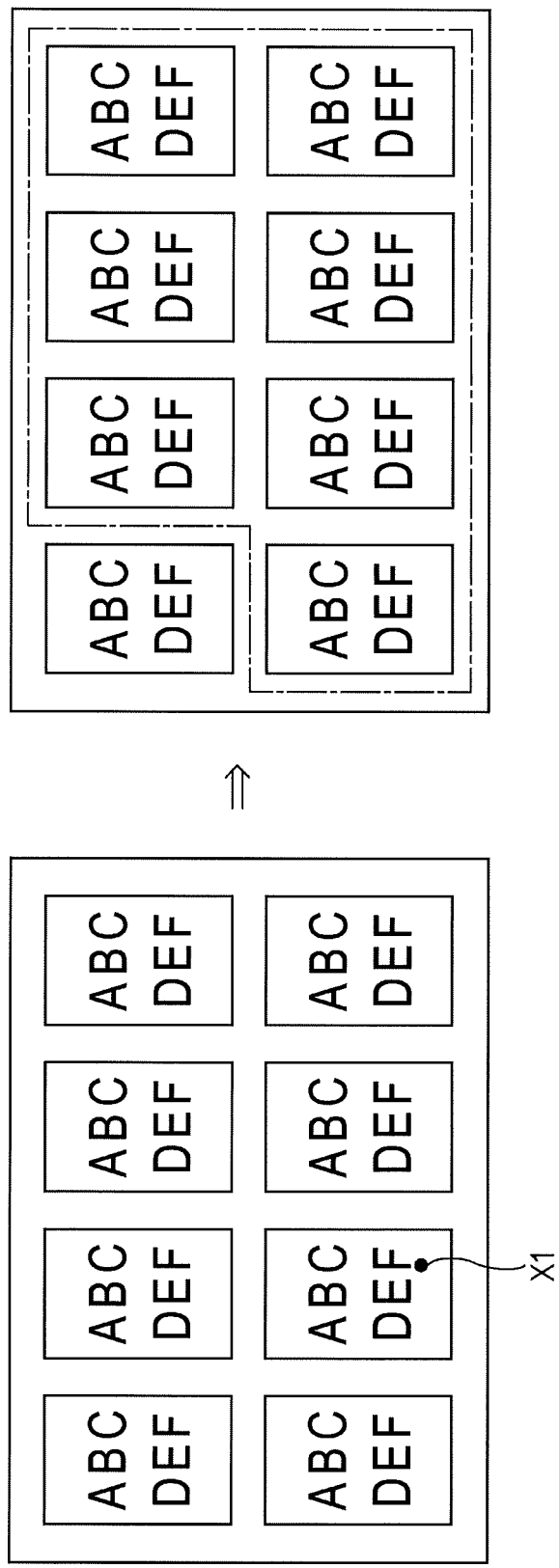
FIG. 1 is a diagram illustrating an example of abnormality occurring in a sheet printed in a repeat mode and a sheet subjected to recovery printing.
Figure 2:
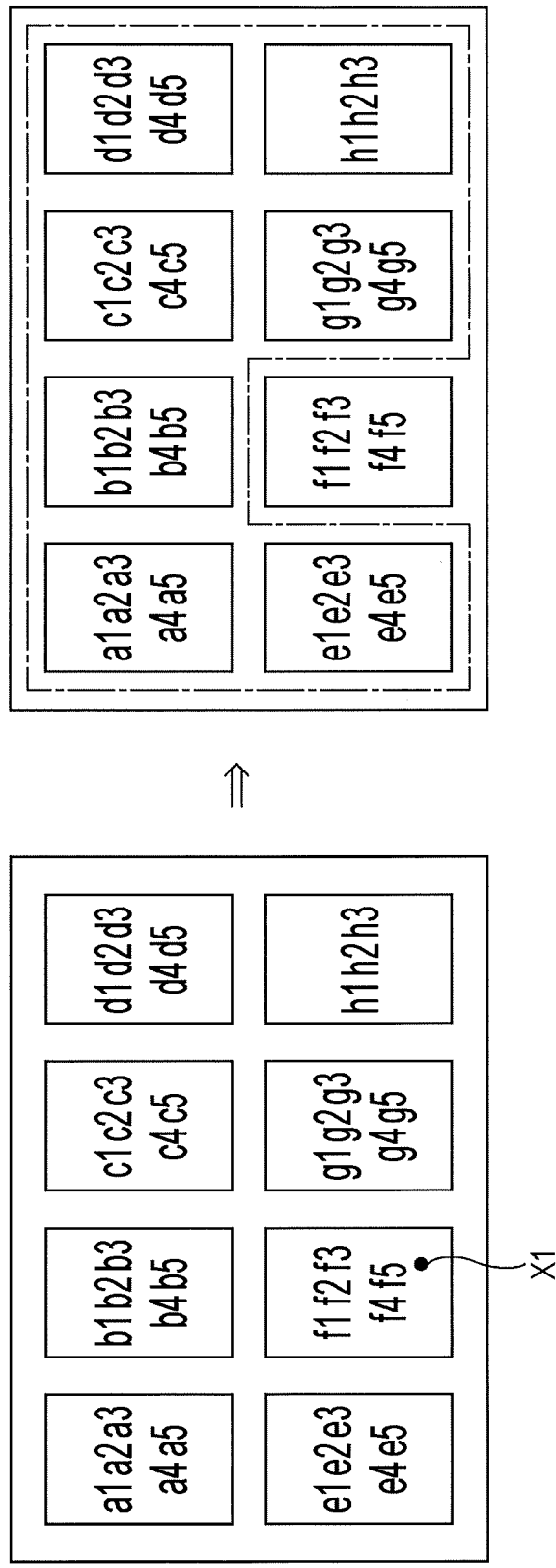
FIG. 2 is a diagram illustrating an example of abnormality occurring in a sheet printed in an aggregation mode and a sheet subjected to the recovery printing.

Hereinafter, one or more embodiments of the present invention will be described with reference to the drawings. However, the scope of the invention is not limited to the disclosed embodiments. In the specification and the drawings, components having substantially the same function and configuration are denoted by the same reference numerals and the description thereof will not be repeated.

Figure 3:
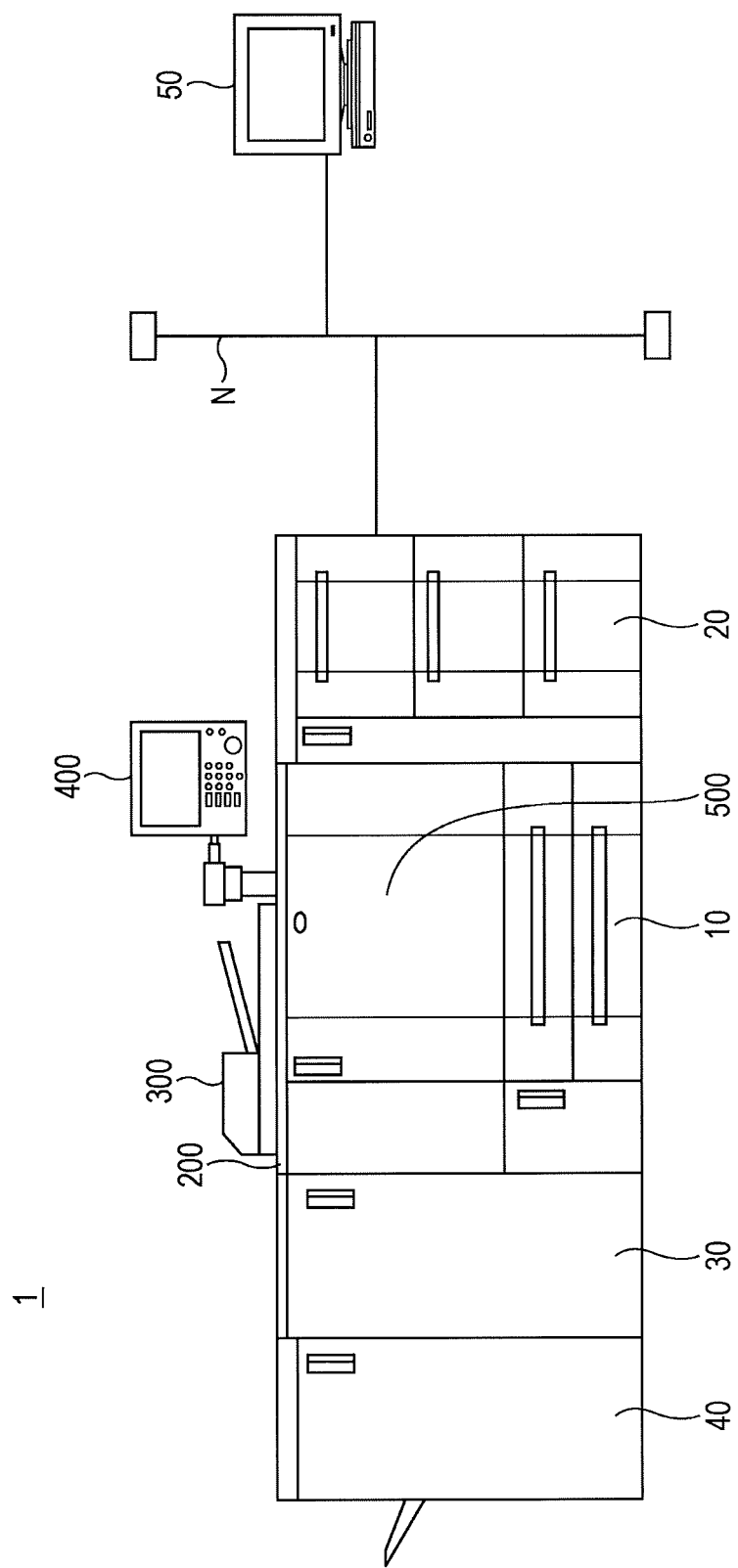
FIG. 3 is a diagram schematically illustrating the configuration of an image forming apparatus according to an embodiment of the present invention.

FIG. 3 is a diagram schematically illustrating the configuration of an image forming apparatus according to an embodiment. As illustrated in FIG. 3, an image forming apparatus 1 according to this embodiment includes a main body 10, a high-capacity paper feeder 20, a reader 30, and a post-processor 40. The image forming apparatus 1 is connected to an information terminal 50 through a network N such as a LAN.

As illustrated in FIG. 3, the main body 10 includes a scanner 200, an auto document feeder (ADF) 300, an operation display 400, and a printer 500. That is, the image forming apparatus 1 according to this embodiment is a so-called digital multi-function machine having a scanner function, a copy function, and a printer function.

The main body 10 is provided with a plurality of paper feed trays having a paper feed mechanism A paper feed sensor (not illustrated) that detects a fed sheet is provided in the vicinity of each paper feed tray. The paper feed trays can store various types of paper with different sizes, such as plain paper, backing paper, recycled paper, high-quality paper, and tap paper.

The reader 30 is an example of an inspection device that reads a printed sheet transported from the main body 10 and inspects whether the sheet is normal. In the following description, an image including abnormality, such as contamination, is referred to as an "abnormal image". An image without including abnormality, such as contamination, is referred to as a "normal image".

A waste sheet according to this embodiment is different from the waste sheet according to the related art. That is, in this embodiment, even in a case in which abnormality is detected from some images on a sheet on which a plurality of images has been imposed, the sheet is not determined to be the waste sheet. That is, in a case in which abnormality is detected from all of the images printed on a sheet, the sheet is determined to be the waste sheet. Sheet inspection is performed on the basis of the image read by charge coupled devices (CCDs) 31 (FIG. 4 which will be described below) which are provided for the front and rear surfaces of the sheet that passes.

The post-processor 40 is a so-called finisher that performs various types of post-processing on the sheet inspected by the reader 30. For example, the post-processor 40 includes a sorting unit that performs a process of sorting the sheets transported from the main body 10, a punching unit that performs a punching process, a folding unit that performs a folding process, a trimming unit that performs a trimming process, and a cutting unit that performs a cutting process. These units are not illustrated.

In addition, the post-processor 40 is provided with a paper discharge tray illustrated in FIG. 22 which will be described below. The sheet transported through the reader 30 is discharged to the paper discharge tray. In a case in which the reader 30 determines that abnormality has been detected from a printed sheet, the post-processor 40 performs control such that the printed sheet is distinguished from the normal sheet and is discharged.

In the image forming apparatus 1, for example, a document loaded on a document tray of the ADF 300 (an example of an automatic document feeder) is transported from a contact glass which is a reading portion of the scanner 200 and an image of the document is read by an optical system of the scanner 200. Here, the image is not limited to image data, such as a figure or a picture, and includes text data such as characters or symbols.

The image (analog image signal) read by the scanner 200 is output to a state manager 100 illustrated in FIG. 4 which will be described below. The state manager 100 sequentially performs A/D conversion and various types of image processing for the image and outputs the processed image to the printer 500 provided in the main body 10. Then, the printer 500 forms an image based on the digital image data on the sheet fed from the paper feed tray or the high-capacity paper feeder 20. The sheet having the image formed thereon is transported to the post-processor 40 through the reader 30 by the paper discharge mechanism. The post-processor 40 performs predetermined post-processing on the sheet and the sheet is discharged to the paper discharge tray.

The image forming apparatus 1 is connected to the external information terminal 50 through the network N. The information terminal 50 transmits various kinds of data including a print command to the image forming apparatus 1. Then, the image forming apparatus 1 performs a printing process of forming an image on a sheet in response to a command from the information terminal 50.

For example, a message indicating that abnormality has occurred in the printed sheet or an abnormal image is displayed on the operation display 400 on the basis of the inspection result of the sheet read by the reader 30. Then, the user can perform a response operation of removing the waste sheet from the paper discharge tray. In addition, the message or the image may be transmitted to the information terminal 50 through the network N and may be displayed on the information terminal 50.

Figure 4:
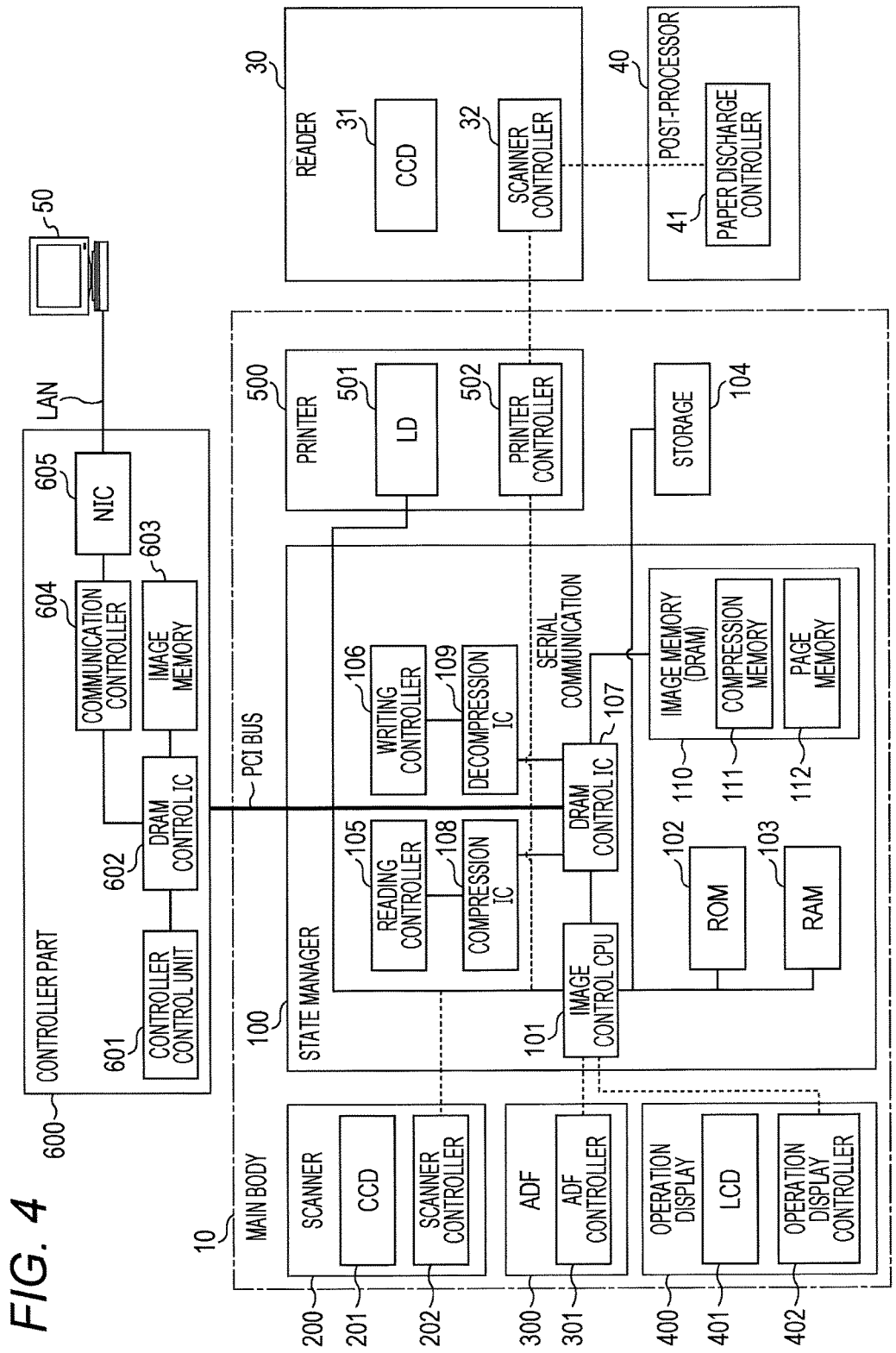
FIG. 4 is a control block diagram illustrating a main portion of the image forming apparatus according to the embodiment of the present invention.

FIG. 4 is a control block diagram illustrating a main portion of the image forming apparatus 1.

The main body 10 includes the state manager 100, the scanner 200, the ADF 300, the operation display 400, the printer 500, and a controller part 600.

The state manager 100 includes an image control central processing unit (CPU) 101, a read only memory (ROM) 102, a random access memory (RAM) 103, a reading processor 105, a writing processor 106, a dynamic random access memory (DRAM) control IC 107, a compression IC 108, a decompression IC 109, and an image memory 110. A storage 104 is connected to the state manager 100.

The image control CPU 101 reads a system program and various processing programs, such as an image formation processing program and a paper discharge processing program, stored in the ROM 102, develops the programs in the RAM 103, and centrally controls the operation of each unit of the image forming apparatus 1 according to the developed programs.

For example, the image control CPU 101 generates a job on the basis of image information input from the scanner 200 or the controller part 600 connected to the state manager 100 and the set information input through the operation display 400 connected to the state manager 100. Then, the image control CPU 101 executes the job to form an image on the sheet. Here, the job indicates a series of operations related to image formation. For example, in a case in which copies including a predetermined number of documents are created, one job is a series of operations related to the formation of the images of a predetermined number of documents.

The ROM 102 is a non-volatile memory, such as a semiconductor memory, and stores the system program corresponding to the image forming apparatus 1 and various processing programs, such as the image formation processing program and the paper discharge processing program, that can be executed on the system program. These programs are stored in the form of program codes that can be read by a computer read and the image control CPU 101 sequentially performs operations according to the program codes.

The RAM 103 forms a work area for temporarily storing various programs executed by the image control CPU 101 and data related to the programs and stores, for example, a job queue and various operation settings.

The storage 104 is, for example, a non-volatile memory and stores various types of set data related to the image forming apparatus 1. In addition, the storage 104 stores image information related to the execution of a job.

The reading processor 105 performs various processes, such as analog signal processing, an A/D conversion process, and a shading process, for the analog image signal input from the scanner 200 to generate digital image data and outputs the digital image data to the compression IC 108.

The writing processor 106 generates a pulse width modulation (PWM) signal on the basis of image data input from the decompression IC 109 and outputs the PWM signal to the printer 500.

The DRAM control IC 107 controls an image data compression process of the compression IC 108, a compressed data decompression process of the decompression IC 109, and image data input/output control in the image memory 110 under the control of the image control CPU 101. For example, in a case in which a command to store the image data read by the scanner 200 is used, the DRAM control IC 107 directs the compression IC 108 to perform a process of compressing the image data input from the reading processor 105 and stores the compressed image data in a compression memory 111 of the image memory 110.

In a case in which a command to form an image of the compressed image data stored in the compression memory 111 is issued, the DRAM control IC 107 reads the compressed image data from the compression memory 111, directs the decompression IC 109 to perform a decompression process, and stores the decompressed image data in a page memory 112. In addition, the DRAM control IC 107 reads the image data stored in the page memory 112 and outputs the image data to the writing processor 106.

The compression IC 108 performs the compression process for the input image data under the control of the DRAM control IC 107.

The decompression IC 109 performs the decompression process for the input compressed image data under the control of the DRAM control IC 107.

The image memory 110 is, for example, a DRAM which is a volatile memory and includes the compression memory 111 and the page memory 112. The compression memory 111 is a memory for storing the compressed image data and the page memory 112 is a memory for temporarily storing the decompressed image data related to image formation before image formation.

The scanner 200 includes an image sensor, such as a CCD 201, and a scanner controller 202. The scanner controller 202 controls the driving of each unit of the scanner 200 on the basis of a control signal from the image control CPU 101. Specifically, an image is read by exposing and scanning the surface of the document loaded on the contact glass and focusing reflected light on the CCD 201. Then, the formed optical signal is converted into an electric signal to generate an analog image signal and the analog image signal is output to the reading processor 105.

The ADF 300 includes an ADF controller 301 that controls the ADF 300 on the basis of a control signal from the image control CPU 101 and automatically feeds the documents loaded on the document tray (not illustrated) one by one onto the contact glass of the scanner 200.

The operation display 400 includes a liquid crystal display (LCD) 401, an operation display controller 402, an operation key group (not illustrated), and a tough panel (not illustrated).

The LCD 401 displays, for example, various setting screens, the state of an image, and the operation state of each function on a screen according to a display control signal from the operation display controller 402. In addition, a pressure-sensitive (resistive-film-pressure) tough panel in which transparent electrodes are arranged in a lattice pattern is formed on the screen of the LCD 401. The LCD 401 detects the XY coordinates of a force point operated by, for example, a finger or a touch pen as a voltage value and outputs the detected position signal as an operation signal to the operation display controller 402.

The operation display controller 402 controls display in the LCD 401 on the basis of a control signal from the image control CPU 101. For example, the operation display controller 402 display, for example, various setting screens for the sheet used for an image forming process or the processes of various processes on the LCD 401. In addition, the operation display controller 402 outputs an operation signal input from the tough panel or the operation key group on the LCD 401 to the image control CPU 101.

The user can see, for example, a basic screen for inputting the print conditions of the image forming process or a list of jobs reserved in the image forming apparatus 1 from the LCD 401 of the operation display 400. Then, the user can operate, for example, the tough panel on the LCD 401 to change various settings related to the image forming process to desired settings.

The printer 500 includes a laser diode (LD) 501 and a printer controller 502 and forms an image on a sheet on the basis of the image data input from the writing processor 106.

The LD 501 includes, for example, an LD, a photoreceptor drum, a charging unit, an exposure unit, a development unit, a transfer unit, a cleaning unit, and a fixing unit. In addition, the LD 501 includes, for example, various rollers, such as a paper feed roller for transporting a sheet along a transportation path in the LD 501, a registration roller, and a paper discharge roller, a transportation path switching plate, and an inversion unit. A transportation unit of the LD 501 feeds the sheet designated by the job from the paper feed tray and transports the fed sheet on the transportation path under the control of the printer controller 502.

In addition, a plurality of sensors is provided on the transportation path of the LD 501. These sensors generate detection signals in a case in which the sheet passes and output the detection signals to the printer controller 502.

The printer controller 502 receives a control signal from the image control CPU 101 and controls the operation of each unit of the LD 501. In addition, the printer controller 502 counts the number of sheets fed for each job on the basis of the detection signals from the sensors provided on the transportation path, and outputs the number of sheets to the image control CPU 101.

In the printer 500, the charging unit electrically charges the surface of the photoreceptor drum in response to a command from the printer controller 502 and the LD emits laser light to the surface of the photoreceptor drum on the basis of the PWM signal input from the writing processor 106 to form an electrostatic latent image. Then, the development unit applies toner to a region including the electrostatic latent image on the surface of the photoreceptor drum and the transfer unit transfers the toner to the sheet to form an image. Then, the fixing unit fixes the transferred image. The sheet having the image formed thereon is transported to the post-processor 40 by the paper discharge roller.

The controller part 600 includes, for example, a controller control unit 601, a DRAM control IC 602, an image memory 603, a communication controller 604, and a network interface card (NIC) 605.

The controller control unit 601 controls the overall operation of each unit and transmits data input from the information terminal 50 through the communication controller 604 and the NIC 605 as a job to the state manager 100.

The DRAM control IC 602 controls the storage of data received by the NIC 605 and the communication controller 604 in the image memory 603 or the reading of data from the image memory 603. In addition, the DRAM control IC 602 is connected to the DRAM control IC 107 of the state manager 100 by a peripheral component interconnect (PCI) bus. The DRAM control IC 602 reads data to be formed as an image from the image memory 603 and outputs the data to the DRAM control IC 107 in response to a command from the controller control unit 601.

The image memory 603 is a DRAM and temporarily stores input data.

The communication controller 604 controls the communication of the NIC 605. The NIC 605 is a communication interface for connection to the network N, receives, for example, image information and a job from the information terminal 50 through the network N, and outputs the received image information and job to the DRAM control IC 602.

The reader 30 includes an image sensor, such as the CCD 31, and a scanner controller 32. The scanner controller 32 controls the driving of each unit of the reader 30 on the basis of a control signal received from the image control CPU 101 through the printer controller 502. Specifically, the scanner controller 32 scans the front and rear surfaces of the sheet transported from the main body 10 and focuses light reflected from the sheet on the CCD 31 to read the image formed on the sheet. Then, the scanner controller 32 generates image data on the basis of the optical signal output from the CCD 31 and transmits the image data to the image control CPU 101 through the printer controller 502.

The post-processor 40 includes a paper discharge controller 41. The post-processor 40 performs various types of post-processing and performs a process of discharging the sheep inspected by the reader 30 to the paper discharge tray. Therefore, the paper discharge controller 41 performs a control process of discharging the sheet on the basis of the inspection result of the scanner controller 32 of the reader 30. Then, the user can acquire the sheets stacked on the paper discharge tray.

Next, the internal configuration of the image forming apparatus 1 will be described with a focus on functional portions.

Figure 5:
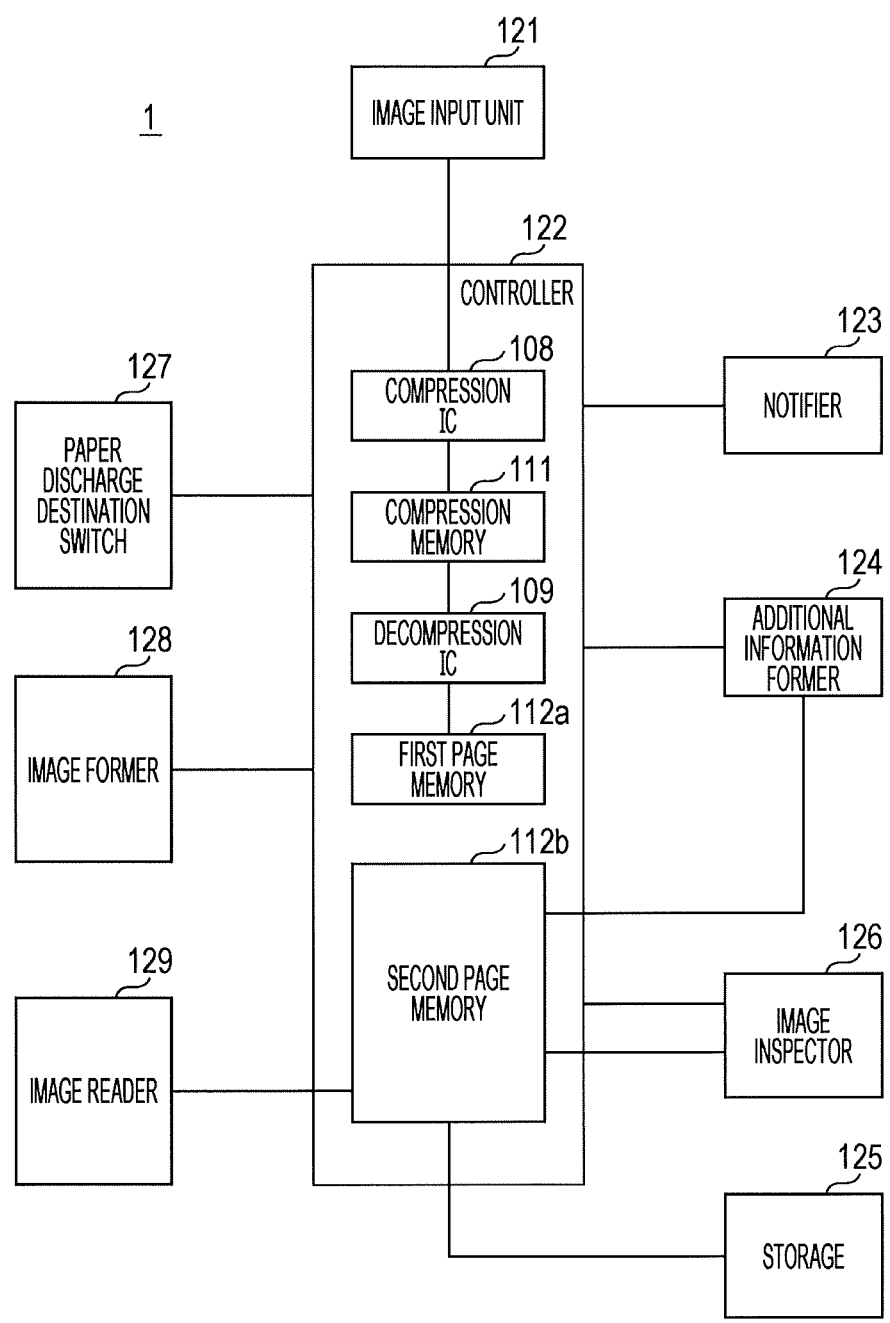
FIG. 5 is a functional block diagram illustrating an example of the internal configuration of the image forming apparatus according to the embodiment of the present invention.

FIG. 5 is a functional block diagram illustrating an example of the internal configuration of the image forming apparatus 1.

The image forming apparatus 1 includes an image input unit 121, a controller 122, a notifier 123, an additional information former 124, a storage 125, an image inspector 126, a paper discharge destination switch 127, an image former 128, and an image reader 129. In FIG. 5, the outline of the functions of each unit will be described.

The image input unit 121 transmits the image input from the controller part 600 illustrated in FIG. 4 to the controller 122. In addition, the image input unit 121 receives, for example, an image inspection command and a command for the number of divisions at the time of cutting from the information terminal 50.

The controller 122 controls, for example, the input and output of images, image inspection, recovery printing, and charging. For example, the controller 122 integrates the number of planes of abnormal images in the printed sheet determined by the image inspector 126 for each unit of cutting of the printed sheet and instructs the image former 128 to perform recovery printing corresponding to the integrated number of planes of abnormal images. In addition, the controller 122 calculates the number of sheets required for recovery printing on the basis of the number of planes of abnormal images in the printed sheet determined by the image inspector 126 and instructs the image former 128 to perform recovery printing corresponding to the number of planes of abnormal images on the calculated number of sheets. Furthermore, the controller 122 calculates the number of sheets required for recovery printing on the basis of the number of planes of abnormal images in the printed sheet determined by the image inspector 126 and instructs the image former 128 to perform recovery printing for the maximum number of planes that can be formed on the calculated number of sheets. In a case in which all of the images included in the unit of cutting of the printed sheet are the normal images, the controller 122 determines a charge for each unit of cutting of the printed sheet in the printed sheet.

In a case in which a sheet including both the abnormal image and the normal image is discharged to the same paper discharge destination as that of a normally printed sheet in response to a command from the controller 122, the notifier 123 notifies what number the sheet including both the abnormal image and the normal image is in a discharge order. In addition, the notifier 123 notifies the paper discharge destinations of the waste sheet whose paper discharge destination has been changed by the paper discharge destination switch 127 and the sheet including both the abnormal image and the normal image. In a case in which the image inspector 126 determines that the printed sheet includes one or more abnormal images, the notifier 123 notifies additional information formed on the printed sheet and the position of the abnormal images on the printed sheet. In addition, the notifier 123 notifies the read image with which abnormality additional information has been combined by the additional information former 124 and then stored in the storage 125. The notifier 123 notifies the information to, for example, the operation display 400 or the information terminal 50.

The additional information former 124 forms additional information related to a sheet in response to a command from the controller 122. The additional information includes, for example, a stamp, print date and time, and a page number and is combined with the input image by the additional information former 124. Therefore, the additional information is also printed in a margin of the sheet printed by the printer 500. In a case in which the image inspector 126 determines that the printed sheet includes one or more abnormal images, the additional information former 124 combines abnormality additional information indicating the content of the abnormal images with a portion which is determined to include the abnormal image in the read image from the storage 125.

The storage 125 stores the read image of the printed sheet read by the reader 30.

In response to a command from the controller 122, the image inspector 126 performs an inspection process of comparing a reference image included in a predetermined unit of inspection with an image selected from the read images on the basis of the unit of inspection. Then, the image inspector 126 obtains the inspection results in which an image selected from the read images that is matched with the reference image is determined to be the normal image and an image selected from the read images that is not matched with the reference image is determined to be the abnormal image. In a case in which a command to cut the printed sheet is issued and the number of divisions of the printed sheet by cutting is designated, the image inspector 126 determines the normal image and the abnormal image included in a plurality of images imposed on the printed sheet, using the unit of cutting of the printed sheet calculated from the number of divisions as the unit of inspection. Then, the image inspector 126 determines the sheet in which abnormality has been detected from all of the imposed images to be the waste sheet.

The paper discharge destination switch 127 switches the paper discharge destination of the printed sheet. For example, in a case in which there are a plurality of paper discharge trays, the paper discharge destination switch 127 switches the paper discharge destinations of the waste sheet and the sheet including both the abnormal image and the normal image and discharges the sheets, in response to a command to switch the paper discharge destinations of the waste sheet and the sheet including both the abnormal image and the normal image and to discharge the sheets from the controller 122.

In response to a command from the controller 122, the image former 128 outputs the printed sheet obtained by forming a plurality of imposed images on a sheet. In addition, the image former 128 forms an image with additional information inserted in the margin of the sheet in response to a command from the controller 122.

The image reader 129 reads the sheet on which the image has been printed by the image former 128 and outputs the read image. The read image is stored in, for example, the storage 125.

The functions of the image input unit 121 are implemented by, for example, the DRAM control IC 107 provided in the state manager 100 illustrated in FIG. 4. The functions of the controller 122, the additional information former 124, the storage 125, and the image inspector 126 are implemented by, for example, the image control CPU 101 provided in the state manager 100. The functions of the paper discharge destination switch 127 are implemented by, for example, the paper discharge controller 41 of the post-processor 40. The functions of the image former 128 are implemented by, for example, the printer 500. The functions of the image reader 129 are implemented by, for example, the reader 30.

Figure 6:
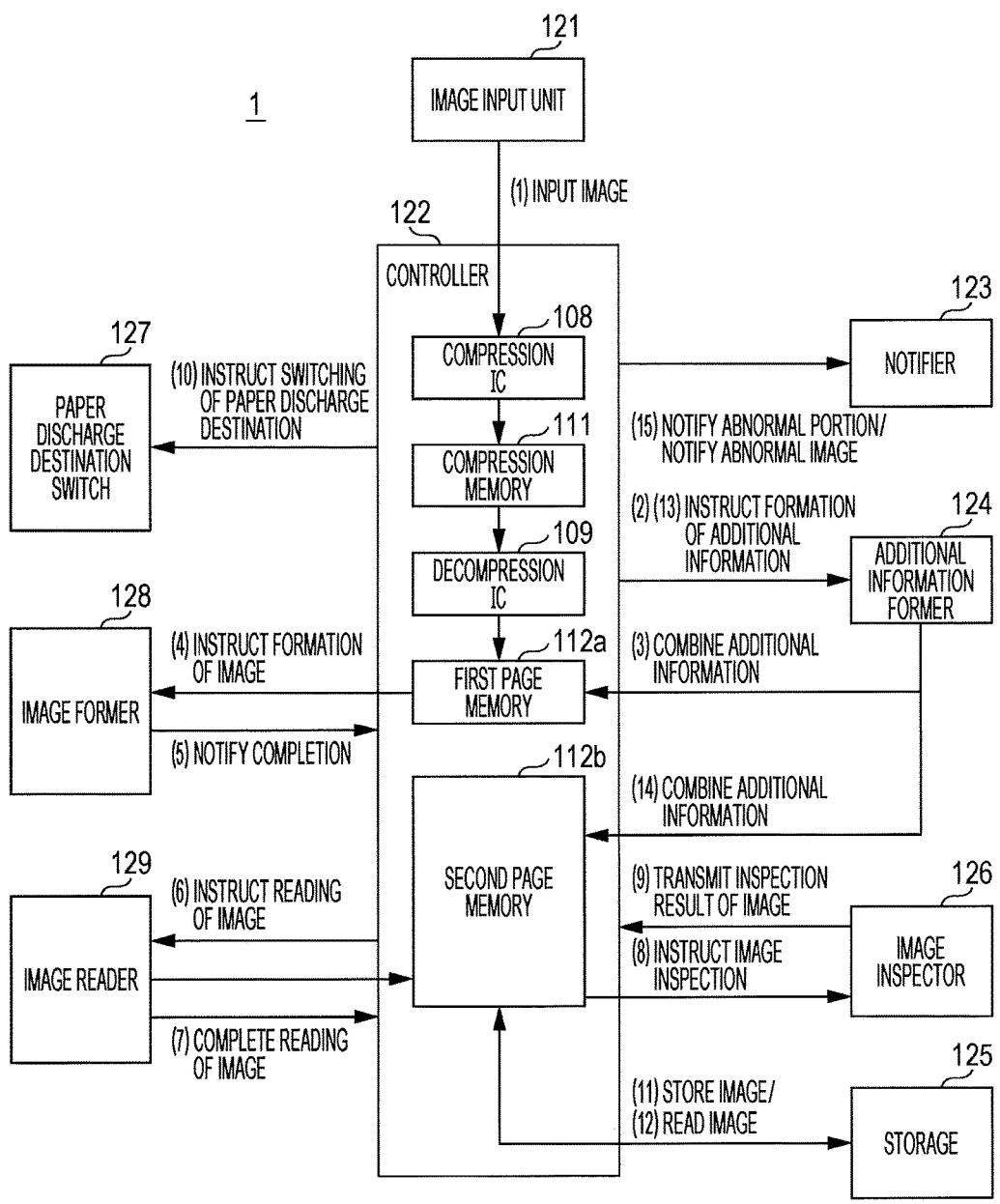
FIG. 6 is a functional block diagram illustrating an example of the operation of each unit of the image forming apparatus according to the embodiment of the present invention.

FIG. 6 is a functional block diagram illustrating an example of the operation of each unit of the image forming apparatus 1. Each functional block illustrated in FIG. 6 is the same as each functional block illustrated in FIG. 5. In FIG. 6, how each functional block performs processes (1) to (15) illustrated in FIG. 6 in association with other functional blocks will be described.

(1) First, an image is input from the image input unit 121 to the controller 122. The image is received by the image input unit 121 from the controller part 600. Then, the controller 122 starts a job. In a case in which the job starts, the controller 122 compresses the image input from the image input unit 121 with the compression IC 108 and stores the compressed image in the compression memory 111.

Then, the controller 122 decompresses the compressed image stored in the compression memory 111 with the decompression IC 109 and stores the decompressed image in a first page memory 112a. In a case in which the controller 122 performs image imposition, the controller 122 imposes a plurality of images and stores the imposed images in the first page memory 112a. In contrast, in a case in which the controller part 600 performs image imposition, the images received by the image input unit 121 have already been imposed.

(2) Then, the controller 122 instructs the additional information former 124 to form additional information for identifying an individual sheet.

(3) The additional information former 124 generates additional information items which are different identifiers for sheets and combines the additional information with the input image stored in the first page memory 112a.

(4) Then, the controller 122 instructs the image former 128 to form an image. The image former 128 that has received the command from the controller 122 performs a printing process of forming images corresponding to the number of imposed images indicated by job information T2 illustrated in FIG. 9, which will be described below, on a sheet. In a case in which the additional information has been composed with the input image by the additional information former 124, the additional information is printed on the printed sheet. Then, the sheet having the images formed thereon is transported from the main body 10 to the reader 30.

(5) After the transportation of the sheet is completed, the image former 128 notifies the controller 122 that the transportation of the sheet having the images formed thereon has been completed.

(6) Then, the controller 122 determines whether there is an image inspection command on the basis of job information T1 illustrated in FIG. 9 which will be described below. In a case in which the image inspection command is present in the job information T1, the controller 122 instructs the image reader 129 to read the image.

(7) The image reader 129 reads the image formed on the printed sheet transported from the main body 10 and stores the read image in a second page memory 112b. Then, the image reader 129 notifies the controller 122 that reading has been completed.

(8) Then, the controller 122 instructs the image inspector 126 to inspect the image.

(9) The image inspector 126 reads the read image stored in the second page memory 112b and inspects whether abnormality, such as contamination, is included in the read image for each unit of inspection of the printed sheet. The unit of inspection is generally the same as the unit of cutting of the printed sheet and is calculated by the number of divisions in a main scanning direction and the number of divisions in a sub-scanning direction in the job information T1. In a case in which the image inspector 126 detects that abnormality is included in the read image, the image inspector 126 notifies the controller 122 of the portion (plane) from which abnormality has been detected. The controller 122 that has received the notification calculates a charge on the basis of the number of abnormal planes notified by the image inspector 126. In addition, the controller 122 calculates the number of recovery images required for recovery printing on the basis of the number of abnormal planes. The calculation of the charge and the number of recovery planes will be described in detail below.

(10) Then, the controller 122 instructs the paper discharge destination switch 127 to switch the paper discharge destination on the basis of the inspection result of the image by the image inspector 126. The paper discharge destinations provided in the post-processor 40 include a normal paper discharge tray 45, a paper discharge tray 46 for an entirely abnormal sheet, and a paper discharge tray 47 for a partially abnormal sheet illustrated in FIG. 22. The process of instructing the change of the paper discharge destination will be described in detail with reference to FIG. 22 which will be described below. Then, the sheet from which the image has been read by the image reader 129 is discharged to the paper discharge destination switched by the paper discharge destination switch 127.

(11) Then, the controller 122 stores the read image of the sheet from which abnormality has been detected by the image inspector 126 in the storage 125.

(12) Then, the controller 122 reads the read image of the sheet, from which abnormality has been detected, from the storage 125 and writes the read image in the second page memory 112b.

Figure 24:
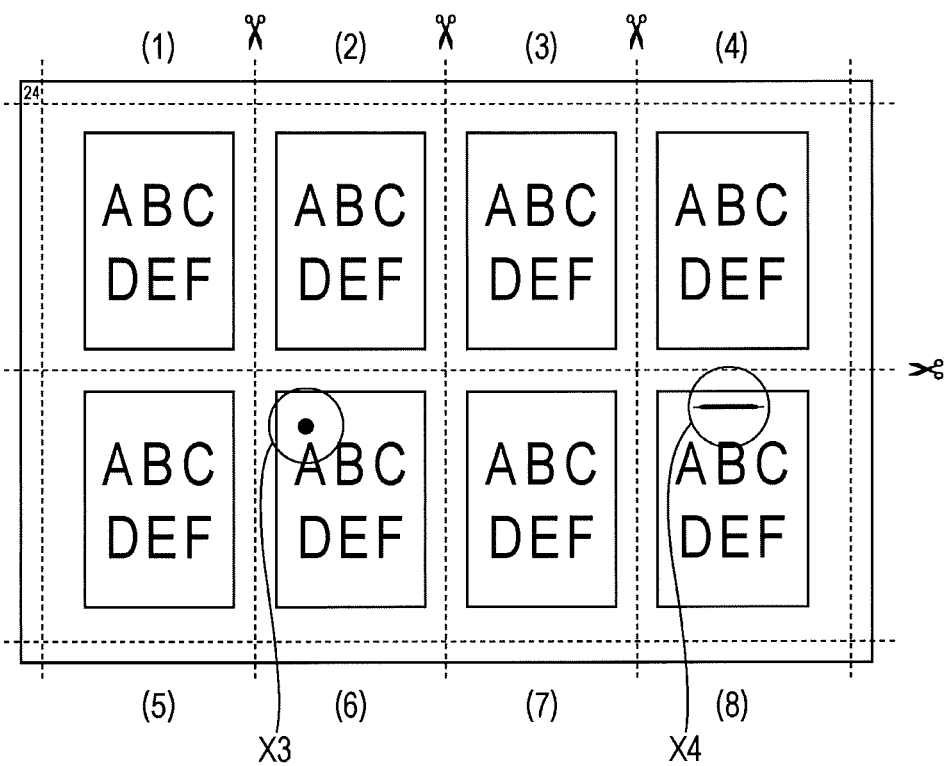
FIG. 24 is a diagram illustrating an example of the additional information combined with a read image in the embodiment of the present invention.

(13) Then, the controller 122 instructs the additional information former 124 to form abnormality additional information for notifying the user of an abnormal portion. The abnormality additional information is, for example, a mark X3 that indicates abnormality, such as contamination, in the sheet and is displayed so as to be highlighted, as illustrated in FIG. 24 which will be described below.

(14) In a case in which the abnormality additional information is generated in response to a command from the controller 122, the additional information former 124 combines the abnormality additional information with the read image stored in the second page memory 112b.

(15) Then, the controller 122 instructs the notifier 123 to notify the abnormality. The notifier 123 notifies the user of, for example, information indicating what number the sheet including both the abnormal image and the normal image is in the discharge order. In addition, the notifier 123 notifies the user of the read image with which the abnormality additional information has been combined.

Then, in a case in which the controller part 600 imposes the input images, the controller 122 notifies the controller part 600 of the number of recovery planes and the information of the image to be recovered and instructs the controller part 600 to perform recovery printing. In addition, in a case in which the controller 122 imposes the input image, the controller 122 performs recovery printing on the basis of the calculated number of recovery planes and the information of the image to be recovered. In the recovery printing, the above-mentioned processes (1) to (15) are repeatedly performed.

Next, the detailed content of the processes will be described.

In the related art, in both the repeat mode and the aggregation mode, in a case in which abnormality has been detected from a portion of the sheet, the entire sheet is determined to be the waste sheet. However, in a case in which a plurality of images is imposed and printed on one sheet and the printed sheet is cut and used, the plane without contamination is desired to be used.

Figure 7:
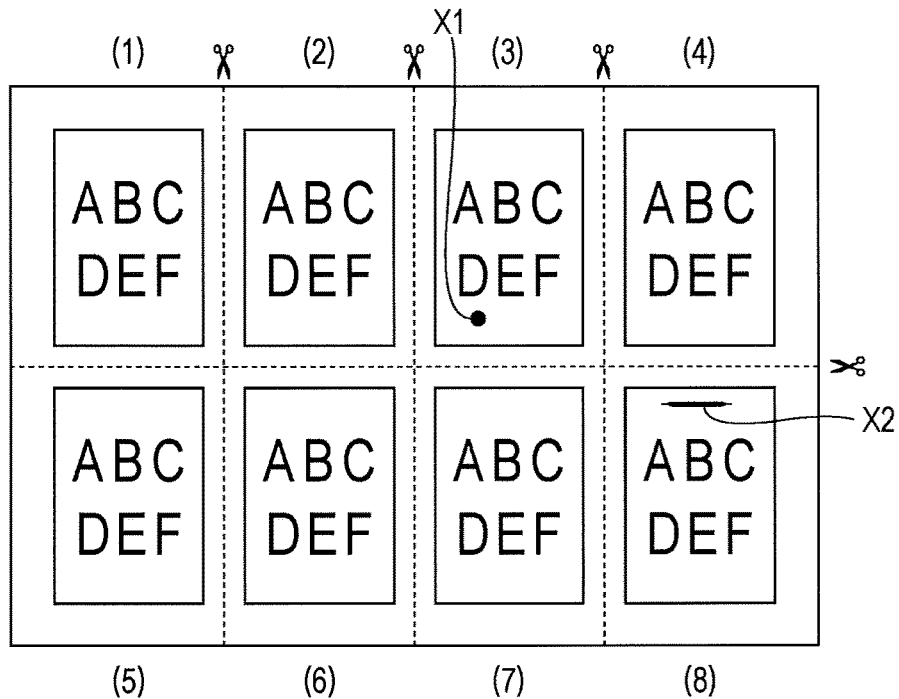
FIG. 7 is a diagram illustrating an example in which abnormality occurs in a sheet printed in the repeat mode in the embodiment of the present invention.

FIG. 7 is a diagram illustrating an example in which abnormality occurs in the sheet printed in the repeat mode.

FIG. 7 illustrates an example in which the same image is printed on eight planes of one sheet. In the following description, a dashed line with a scissors mark indicates a line along with the sheet is cut. The mark and the dashed line are provided for description and are not printed on the actual sheet. In FIG. 7, an image in one plane represented by the dashed line is the unit of cutting. However, in some cases, a plurality of images is one unit of cutting. Therefore, in a case in which the image in one plane is the unit of cutting, the number of planes allocated to the sheet is equal to the number of planes represented by the units of cutting. However, in a case in which images in a plurality of planes are one unit of cutting, the number of planes allocated to the sheet is different from the number of planes represented by the units of cutting.

In the sheet illustrated in FIG. 7, plane numbers (1) to (4) are given from the upper left to the right of the sheet and plane numbers (5) to (8) are given from the lower left to the right of the sheet, in order to identify the planes allocated to the sheet. In the sheet illustrated in FIG. 7, abnormality X1 which is contamination is present in the plane number (3) and abnormality X2 which is a stripe is present in the plane number (8). However, the plane numbers (1), (2), and (4) to (7) other than the plane numbers (3) and (8) indicate the normally printed images. Therefore, after the sheet is cut, it is possible to use the plane numbers (1), (2), and (4) to (7). Here, the image inspector 126 according to this embodiment determines whether there is a normally printed plane among a plurality of images printed on one sheet in the repeat mode.

Figure 8:
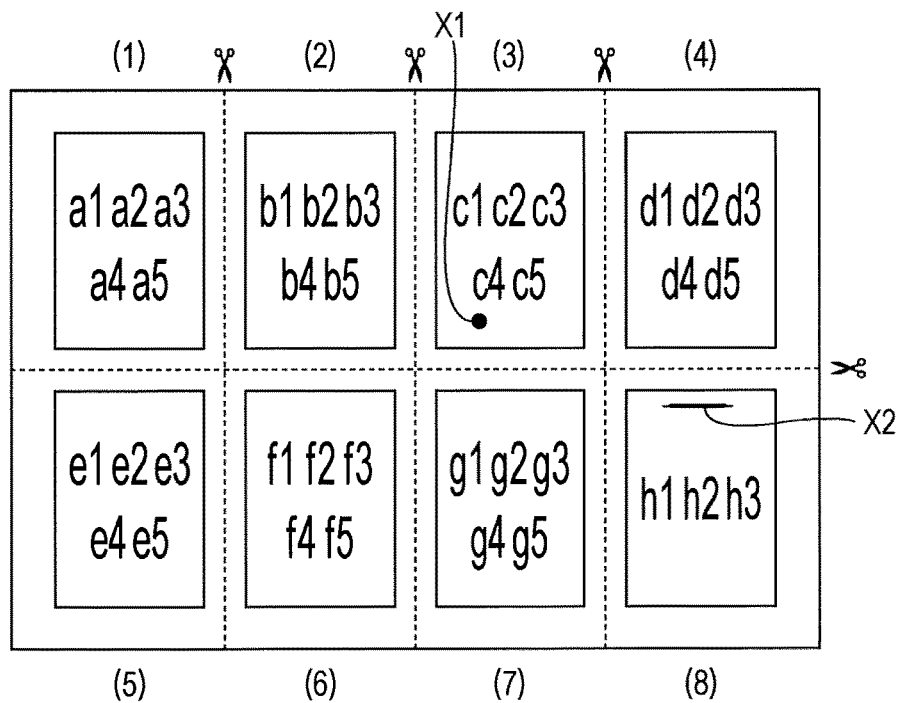
FIG. 8 is a diagram illustrating an example in which abnormality occurs in a sheet printed in the aggregation mode in the embodiment of the present invention.

FIG. 8 is a diagram illustrating an example in which abnormality occurs in a sheet printed in the aggregation mode. FIG. 8 illustrates an example in which different images are printed on eight planes of one sheet. In some cases, in the aggregation mode, a plurality of planes is printed on one sheet in order to simply save the sheets. In addition, in the aggregation mode, the sheet is cut into a plurality of plane units and the cut sheet is folded into a booklet. In FIG. 8, the same mark and dashed line as those illustrated in FIG. 7 are illustrated.

Similarly to the sheet illustrated in FIG. 7, in the sheet illustrated in FIG. 8, the abnormality X1 is present in plane number (3) and the abnormality X2 is present in plane number (8). However, after the sheet is cut, it is possible to use plane numbers (1), (2), and (4) to (7) that have been normally printed. The image inspector 126 according to this embodiment determines whether there is a normally printed plane among a plurality of images printed on one sheet in the aggregation mode.

In a case in which the image inspector 126 detects an abnormal image in the sheet and there is at least one plane of the normal image in the sheet, the controller 122 distinguishes the sheet from the waste sheet. Then, the controller 122 performs a control process of changing the paper discharge destinations of the waste sheet and the sheet including both the normal image and the abnormal image in order to reuse the normal image. In addition, the controller 122 performs a control process of calculating the number of recovery planes on the premise that the sheet including both the normal image and the abnormal image is reused and prints recovery images corresponding to a shortage of the normal images.

Here, job information included in the job will be described.

FIG. 9 is a diagram illustrating an example of the configuration of the job information T1 and the job information T2.

The job information T1 includes information related to the designation, by the controller part 600, of the operation of a job. Examples of the information include information indicating whether image inspection is performed, information indicating whether a sheet is cut, the number of divisions in the main scanning direction, and the number of divisions in the sub-scanning direction. Designation by the job information T1 may be performed for all jobs (all pages) or each page.

The information indicating whether image inspection is performed is information for designating whether to perform image inspection for the printed sheet.

The information indicating whether a sheet is cut is information for designating whether to cut the printed sheet.

The number of divisions in the main scanning direction is information for designating the number of divisions in the main scanning direction at the time of cutting. The main scanning direction is a direction perpendicular to the direction in which the sheet is transported.

The number of divisions in the sub-scanning direction is information for designating the number of divisions in the sub-scanning direction at the time of cutting. The sub-scanning direction is a direction parallel to the direction in which the sheet is transported.

The job information T2 is information that is referred to in a case in which the image forming apparatus 1 imposes images. In this embodiment, the images are imposed by the controller part 600 or the image forming apparatus 1 (main body 10). Examples of the information included in the job information T2 include the number of imposed images in the main scanning direction and the number of imposed images in the sub-scanning direction. The number of imposed images in the main scanning direction is information for designating the number of images imposed in the main scanning direction.

The number of imposed images in the sub-scanning direction is information for designating the number of images imposed in the sub-scanning direction.

Next, the reference image will be described.

Images may be imposed on the sheet by the controller part 600 or the controller 122 in the image forming apparatus 1. In a case in which images are imposed by the controller part 600, in the inspection of the printed sheet by the image inspector 126, the image read by the image reader 129 is compared with the reference image transmitted from the controller part 600 to the image inspector 126 through the controller 122. In a case in which images are imposed by the controller 122, the image read by the image reader 129 is compared with the reference image transmitted from the controller 122 to the image inspector 126.

Figures 10, 11:
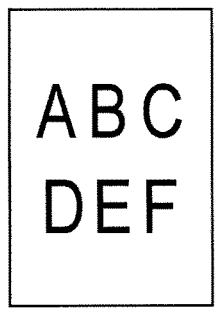
FIG. 10 is a diagram illustrating an example of a reference image according to the embodiment of the present invention.
FIG. 11 is a diagram illustrating an example of the configuration of the job information according to the embodiment of the present invention.

FIG. 10 is a diagram illustrating an example of the reference image.

For example, in the repeat mode illustrated in FIG. 7, one of a plurality of same images imposed on the sheet is used as the reference image. In FIG. 10, one of the images imposed on the sheet that is printed in the repeat mode is illustrated as an example of the reference image. In the aggregation mode illustrated in FIG. 8, each of a plurality of different images imposed on the sheet is used as the reference image, which is not illustrated in the drawings.

An method of inspection by the image inspector 126 using the reference image is not necessarily limited to a method using the reference image acquired from the controller part 600. For example, the image inspector 126 may use the image read from the first copy of the printed sheet by the image reader 129 as the reference image and may compare the reference image with the image read from the second and subsequent copies of the printed image by the image reader 129.

In a case in which the unit of cutting is designated by the job information T1, the unit of cutting, that is, images including a plurality of planes are incorporated into the reference image. In this case, the image transmitted from the controller part 600 may be used as the reference image or an image obtained by scanning and reading the printed sheet may be used as the reference image. Then, the image inspector 126 performs image inspection on the basis of the reference image. Therefore, the unit of inspection in a case in which the image inspector 126 performs image inspection is the same as the unit of cutting.

In a case in which the controller part 600 imposes images and the job information T1 is absent, the controller part 600 may have a cutting instruction unit (not illustrated) that can designate the unit of cutting. The controller 122 cuts images formed by a plurality of planes in the unit designated by the cutting instruction unit from the images received from the controller part 600 and uses the cut images as the reference image.

In contrast, in a case in which the image control CPU 101 of the main body 10 imposes images, the controller 122 combines the images received from the controller part 600 in the unit designated by the cutting instruction unit of the controller part 600 and uses the combined image as the reference image. In a case in which the image obtained by scanning and reading the printed sheet is used as the reference image, the controller 122 cuts images formed by a plurality of planes in the unit designated by the cutting instruction unit from the image obtained by scanning and reading and uses the cut images as the reference image.

Next, the job information will be described again.

FIG. 11 is a diagram illustrating an example of the configuration of job information T3.

The job information T3 includes information related to the designation, by the controller part 600, of the operation of a job. For example, an item indicating that image inspection is performed and an item indicating that image inspection is not performed are in the rows of the job information T3 and an item indicating that cutting is performed and an item indicating that cutting is not performed are in the columns of the job information T3. Therefore, the rows and columns of the job information T3 are combined to designate whether or not image inspection is required and whether or not cutting is required.

For example, in a case in which image inspection and cutting are designated to be performed in the job, the image inspector 126 inspects images in the designated unit of cutting. In a case in which image inspection is designated to be performed and cutting is not designated to be performed in the job, the image inspector 126 inspects images, using the entire sheet as a unit. In a case in which image inspection is not designated to be performed and cutting is designated to be performed in the job, the image inspector 126 does not inspect an image on the cut sheet. In a case in which image inspection and cutting are not designated to be performed in the job, the sheet is not cut and image inspection is not performed. As such, the image inspector 126 determines whether to detect abnormality using the entire surface of the sheet as a unit or to detect abnormality using the cut sheet as a unit, on the basis of whether image inspection and cutting are designated to be performed in the job information T3.

Next, the unit of inspection in image inspection and the number of sheets subjected to recovery printing will be described.

Figure 12:
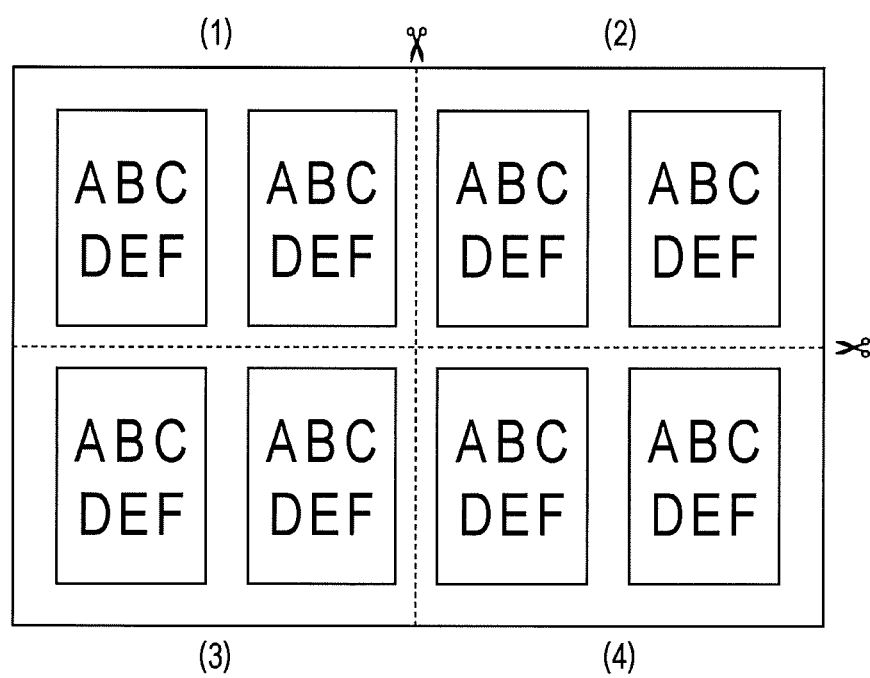
FIG. 12 is a diagram illustrating the unit of inspection in a case in which one sheet is divided and cut into four parts in the embodiment of the present invention.

FIG. 12 is a diagram illustrating the unit of inspection in a case in which one sheet is divided and cut into four parts. Here, it is assumed that the number of divisions in the main scanning direction designated by the job information T1 is "2" and the number of divisions in the sub-scanning direction designated by the job information T1 is "2". In FIG. 12, numbers (1) to (4) are given to the units of cutting. Therefore, one unit of cutting includes images of two planes. The unit of cutting is the unit of inspection in the image inspection performed by the image inspector 126. In the example illustrated in FIG. 12, in a case in which the sub-scanning direction is a direction from the right to the left of the sheet, two images combined in the sub-scanning direction are the unit of inspection. The image inspector 126 inspects the images using the reference image (images of two planes) indicated by the unit of inspection.

Figures 13A, 13B:
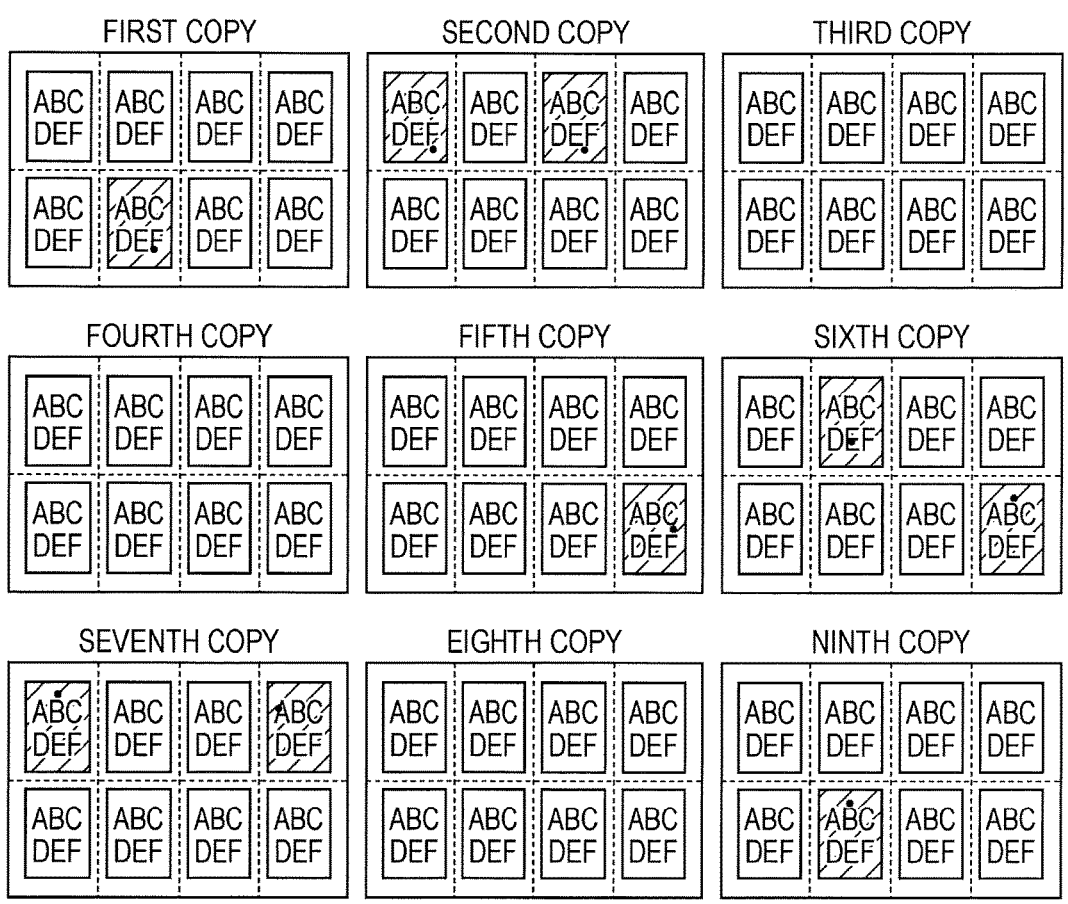
FIGS. 13A and 13B are diagrams for calculating the number of sheets required for recovery printing in a case in which abnormality has been detected from the sheet printed in the repeat mode in the embodiment of the present invention.

FIGS. 13A and 13B are diagrams for calculating the number of sheets required for recovery printing in a case in which abnormality has been detected from the sheet printed in the repeat mode. FIG. 13A illustrates a table storing the number of planes (the number of abnormal planes) from which abnormality has been detected in the unit of cutting by the image inspector 126. FIG. 13B illustrates an example in which the plane, from which abnormality (represented by a black circle) has been detected, is hatched and displayed so as to be highlighted.

For example, it is assumed that the number of divisions in the main scanning direction designated by the job information T1 is "2" and the number of divisions in the sub-scanning direction designated by the job information T1 is "4" for the sheet printed in the repeat mode. The image former 128 prints nine copies of the sheet (nine sheets) on which the same images corresponding to eight planes are imposed. The unit of cutting of the sheet is one plane printed in the main scanning direction and one plane printed in the sub-scanning direction. The inspection results of the image inspector 126 show that the total number of abnormal planes represented by the units of cutting in the first to ninth copies is the total number of abnormal planes=1+2+0+0+1+2+2+0+1=9, as illustrated in FIG. 13A.

Images of eight planes are imposed on one sheet. The number of sheets required to obtain images of nine normally printed planes is calculated to be 1.125 (=9/8), as a result of dividing "9" which is the total number of abnormal planes represented by the units of cutting by "8" which is the total number of units of cutting per sheet. Then, 1.125 is rounded up and 2 is obtained as the number of sheets required for recovery printing. The image former 128 performs recovery printing to print images of a total of 16 planes on two sheets. Therefore, it is possible to obtain images of nine normally printed planes from two sheets obtained by recovery printing, instead of mages of nine planes which have been excluded due to abnormality.

Figures 14A, 14B:
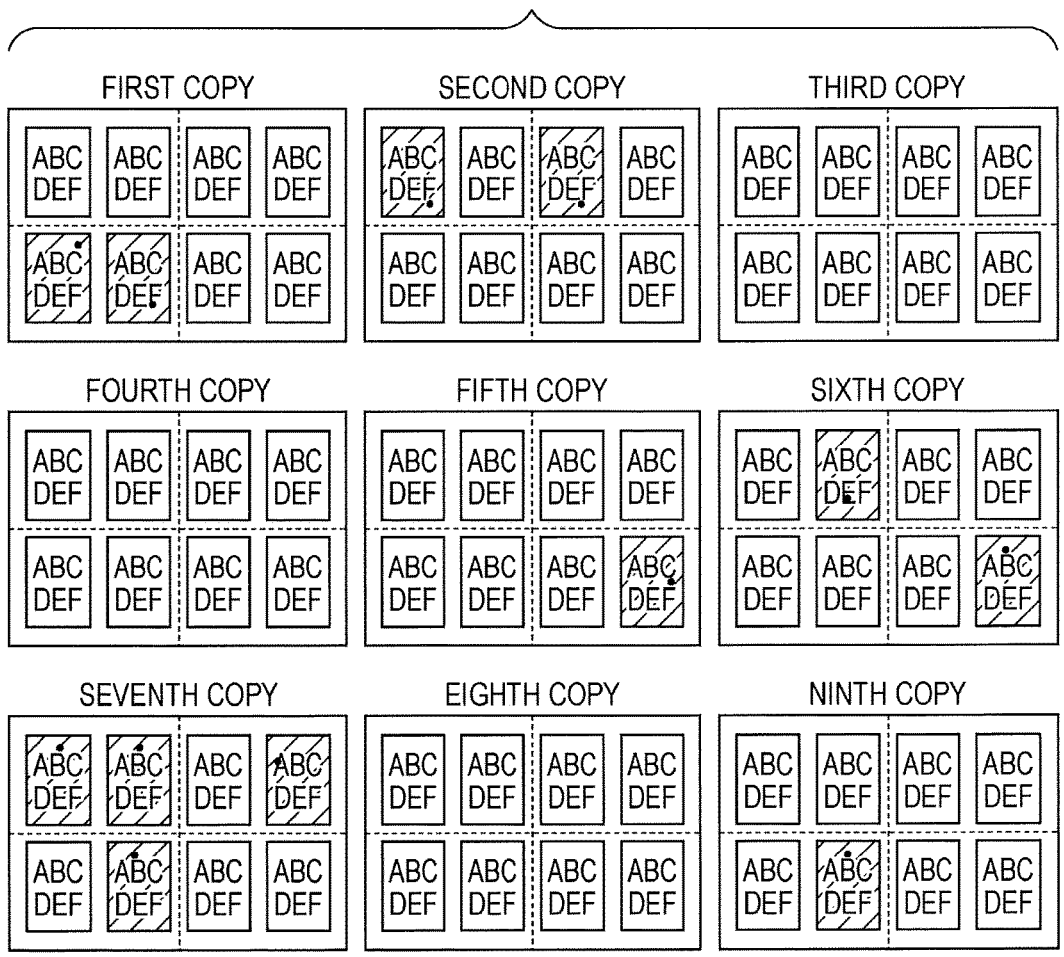
FIGS. 14A and 14B are diagrams for calculating the number of sheets required for recovery printing in a case in which abnormality has been detected from the sheet printed in the repeat mode in the embodiment of the present invention.

FIGS. 14A and 14B are diagrams for calculating the number of sheets required for recovery printing in a case in which abnormality has been detected from the sheet printed in the repeat mode. FIG. 14A illustrates a table storing the number of planes from which abnormality has been detected in the unit of cutting by the image inspector 126. FIG. 14B illustrates an example in which the plane, from which abnormality has been detected, is hatched and displayed so as to be highlighted.

For example, it is assumed that the number of divisions in the main scanning direction designated by the job information T1 is "2" and the number of divisions in the sub-scanning direction designated by the job information T1 is "2" for the sheet printed in the repeat mode. The image former 128 prints nine copies of the sheet (nine sheets) on which the same images corresponding to eight planes are imposed. The unit of cutting of the sheet is one plane printed in the main scanning direction and two adjacent planes printed in the sub-scanning direction. Therefore, the total number of units of cutting is "4". Two abnormalities are detected from the lower left portion of the first copy and the upper left portion of the seventh copy and occur in the same unit of cutting. Therefore, the number of abnormalities represented by the units of cutting in the first and seventh copies is represented by "1". The inspection results of the image inspector 126 show that the total number of abnormal planes represented by the units of cutting in the first to ninth copies is the total number of abnormal planes=1+2+0+0+1+2+3+0+1=10, as illustrated in FIG. 14A.

The number of sheets required to obtain images of nine normally printed planes represented by the units of cutting is calculated to be 2.5 (=10/4), as a result of dividing "10" which is the total number of abnormal planes represented by the units of cutting by "4" which is the total number of units of cutting per sheet. Then, 2.5 is rounded up and 3 is obtained as the number of sheets required for recovery printing. The image former 128 performs recovery printing to print images of a total of 12 planes represented by the units of cutting on three sheets. Therefore, it is possible to obtain images of ten normally printed planes represented by the units of cutting from three sheets obtained by recovery printing, instead of images of ten planes which have been excluded due to abnormality.

FIGS. 15A and 15B are diagrams for calculating the number of sheets required for recovery printing in a case in which abnormality has been detected from the sheet printed in the aggregation mode. FIG. 15A illustrates a table storing the number of planes from which abnormality has been detected in the unit of cutting by the image inspector 126. FIG. 15B illustrates an example in which the plane, from which abnormality has been detected, is hatched and displayed so as to be highlighted.

For example, it is assumed that the number of divisions in the main scanning direction designated by the job information T1 is "2" and the number of divisions in the sub-scanning direction designated by the job information T1 is "4" for the sheet printed in the aggregation mode. The image former 128 prints five pages of the sheet on which different images corresponding to eight planes are imposed. However, images of six planes are printed on the sixth page. The unit of cutting of the sheet is one plane printed in the main scanning direction and one plane continuously printed in the sub-scanning direction. Therefore, the total number of units of cutting is "8". The inspection results of the image inspector 126 show that the total number of abnormal planes represented by the units of cutting in the first to sixth pages is the total number of abnormal planes=1+2+0+0+1+1=5, as illustrated in FIG. 15A.

Images of eight planes are imposed on one sheet. The number of sheets required to obtain images of five normally printed planes is calculated to be 0.625 (=5/8), as a result of dividing "5" which is the total number of abnormal planes represented by the units of cutting by "8" which is the total number of units of cutting per sheet. Then, 0.625 is rounded up and 1 is obtained as the number of sheets required for recovery printing. The image former 128 performs recovery printing on the plane, from which abnormality has been detected, to print images of a total of five planes on one sheet. Therefore, it is possible to obtain images of five normally printed planes from one sheet obtained by recovery printing, instead of images of five planes represented by the units of cutting which have been excluded due to abnormality.

Figures 16A, 16B:
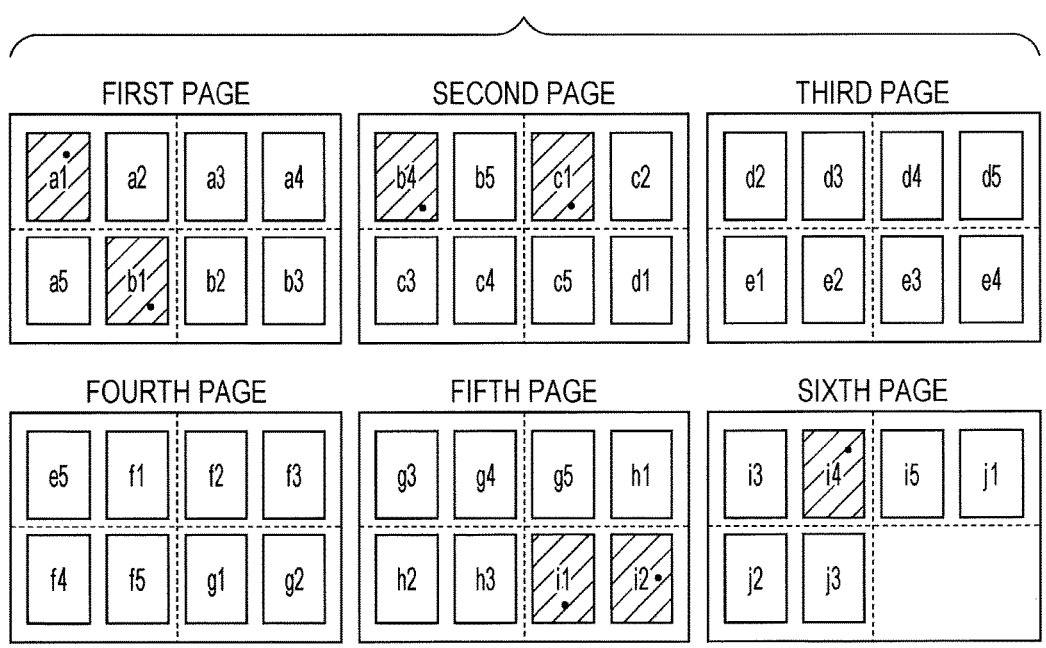
FIGS. 16A and 16B are diagrams for calculating the number of sheets required for recovery printing in a case in which abnormality has been detected from the sheet printed in the aggregation mode in the embodiment of the present invention.

FIGS. 16A and 16B are diagrams for calculating the number of sheets required for recovery printing in a case in which abnormality has been detected from the sheet printed in the aggregation mode. FIG. 16A illustrates a table storing the number of planes from which abnormality has been detected in the unit of cutting by the image inspector 126. FIG. 16B illustrates an example in which the plane, from which abnormality has been detected, is hatched and displayed so as to be highlighted.

For example, it is assumed that the number of divisions in the main scanning direction designated by the job information T1 is "2" and the number of divisions in the sub-scanning direction designated by the job information T1 is "2" for the sheet printed in the aggregation mode. The image former 128 prints six pages of the sheet on which different images corresponding to eight planes are imposed. However, images of six planes are printed on the sixth page. The unit of cutting of the sheet is one plane printed in the main scanning direction and two planes continuously printed in the sub-scanning direction. Therefore, the total number of units of cutting is "4". The inspection results of the image inspector 126 show that the total number of abnormal planes represented by the units of cutting in the first to sixth pages is the total number of abnormal planes=2+2+0+0+1+1=6, as illustrated in FIG. 16A.

Images of four planes represented by the units of cutting are imposed on one sheet. The number of sheets required to obtain images of six normally printed planes represented by the units of cutting is calculated to be 1.5 (=6/4), as a result of dividing "6" which is the total number of abnormal planes represented by the units of cutting by "4" which is the total number of units of cutting per sheet. Then, 1.5 is rounded up and 2 is obtained as the number of sheets required for recovery printing. The controller 122 instructs to perform recovery printing for the plane from which abnormality has been detected and the image former 128 prints images of a total of six planes represented by the units of cutting on two sheets. Therefore, it is possible to obtain images of six normally printed planes represented by the units of cutting from two sheets obtained by recovery printing, instead of images of six planes represented by the units of cutting which have been excluded due to abnormality.

First Example of Recovery Printing

Next, a method in a case in which recovery printing is performed on the necessary number of planes will be described.

Even in a case in which images are printed on one surface of a sheet by recovery printing, in general, some of the planes are actually used. In the first example of the recovery printing, the same number of planes as the number of abnormal planes is printed.

Figure 17:
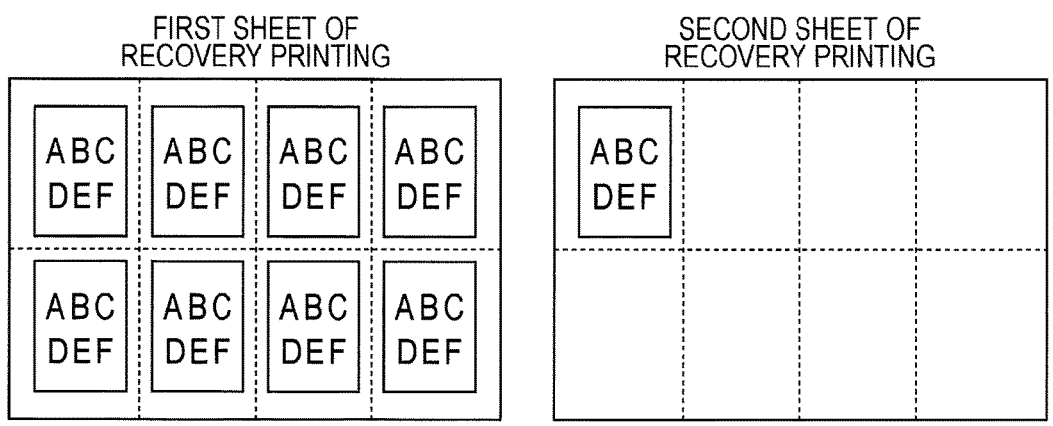
FIG. 17 is a diagram illustrating an example of imposition in a case in which recovery printing is performed in the repeat mode in the embodiment of the present invention.

FIG. 17 is a diagram illustrating an example of imposition in a case in which recovery printing is performed in the repeat mode.

For example, as illustrated in FIG. 13B, the number of divisions in the main scanning direction designated by the job information T1 is "2" and the number of divisions in the sub-scanning direction designated by the job information T1 is "4" for the sheet printed in the repeat mode. In a case in which the calculated total number of abnormal planes represented by the units of cutting in the first to ninth copies is 9 as illustrated in FIG. 13A, recovery printing is performed by printing the images on two sheets.

Eight planes are printed on one sheet in recovery printing for the first sheet and only one plane is printed on a sheet in recovery printing for the second sheet. As such, since unnecessary planes (second to eighth planes) are not printed by the recovery printing for the second sheet, the effect of reducing the consumption of toner used in the printer 500 is obtained.

Figure 18:
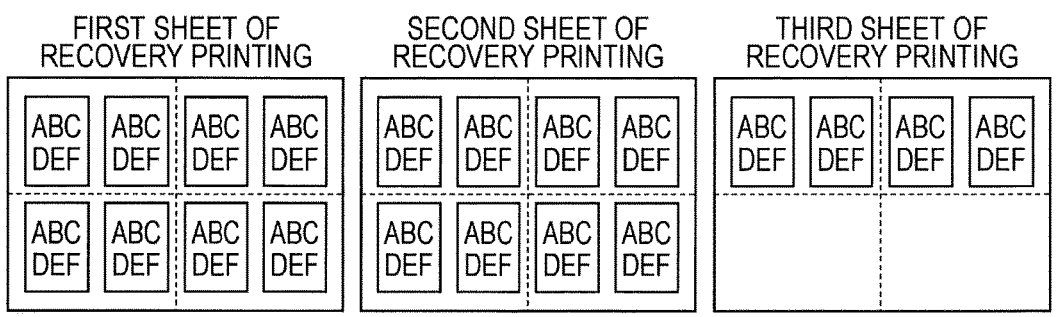
FIG. 18 is a diagram illustrating an example of imposition in a case in which recovery printing is performed in the repeat mode in the embodiment of the present invention.

FIG. 18 is a diagram illustrating an example of imposition in a case in which recovery printing is performed in the repeat mode.

For example, as illustrated in FIG. 14B, the number of divisions in the main scanning direction designated by the job information T1 is "2" and the number of divisions in the sub-scanning direction designated by the job information T1 is "2" for the sheet printed in the repeat mode. Therefore, the total number of units of cutting is "4". In a case in which the calculated total number of abnormal planes represented by the units of cutting in the first to ninth copies is 10 as illustrated in FIG. 14A, recovery printing is performed by printing images on three sheets.

Here, in the recovery printing for the first and second sheets, images of four planes represented by the units of cutting are printed on each sheet. In the recovery printing for the third sheet, only images of two planes represented by the units of cutting are printed on the sheet. As such, since unnecessary planes (the third and fourth planes represented by the units of cutting) are not printed by the recovery printing for the third sheet, the effect of reducing the consumption of toner used in the printer 500 is obtained.

Figure 19:
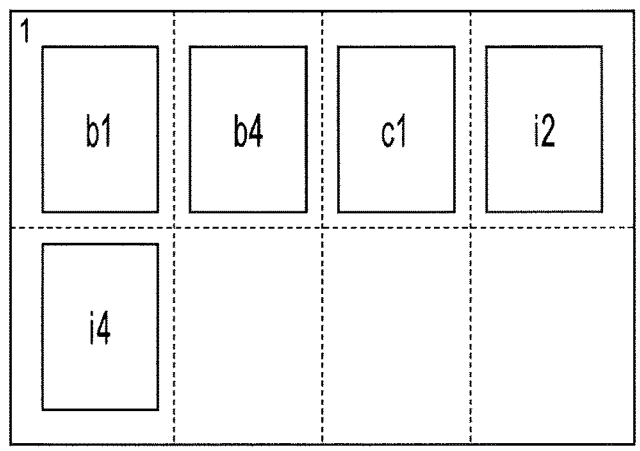
FIG. 19 is a diagram illustrating an example of imposition in a case in which recovery printing is performed in the aggregation mode in the embodiment of the present invention.

FIG. 19 is a diagram illustrating an example of imposition in a case in which recovery printing is performed in the aggregation mode.

For example, as illustrated in FIG. 15B, the number of divisions in the main scanning direction designated by the job information T1 is "2" and the number of divisions in the sub-scanning direction designated by the job information T1 is "4" for the sheet printed in the aggregation mode. Therefore, the total number of units of cutting is "8". In a case in which the calculated total number of abnormal planes represented by the units of cutting in the first to sixth pages is 5 as illustrated in FIG. 15A, recovery printing is performed by printing the images on one page.

Here, in recovery printing for the first page, only the images of the plane from which abnormality has been detected are printed on the sheet. As such, since unnecessary planes are not printed by the recovery printing for the first page, the effect of reducing the consumption of toner used in the printer 500 is obtained.

Figure 20:
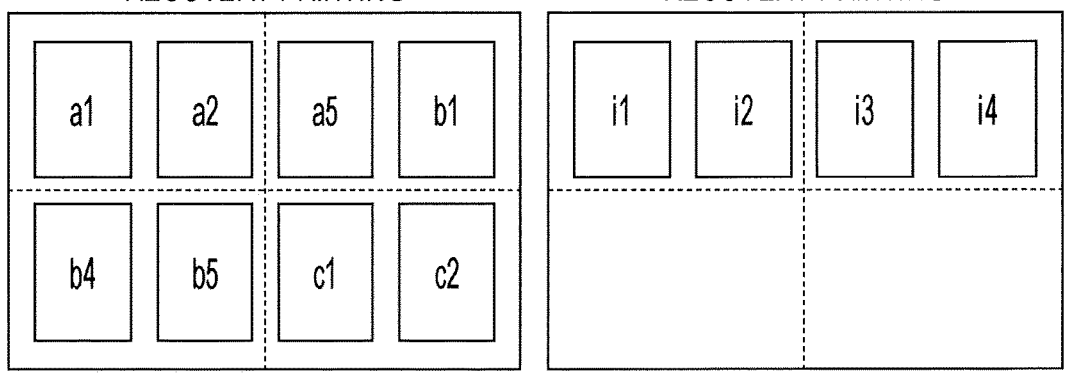
FIG. 20 is a diagram illustrating an example of imposition in a case in which recovery printing is performed in the aggregation mode in the embodiment of the present invention.

FIG. 20 is a diagram illustrating an example of imposition in a case in which recovery printing is performed in the aggregation mode.

For example, as illustrated in FIG. 16B, the number of divisions in the main scanning direction designated by the job information T1 is "2" and the number of divisions in the sub-scanning direction designated by the job information T1 is "2" for the sheet printed in the aggregation mode. Therefore, the total number of units of cutting is "4". In a case in which the calculated total number of abnormal planes represented by the units of cutting in the first to sixth pages is 6 as illustrated in FIG. 16A, recovery printing is performed by printing images on two pages.

Here, in recovery printing for the first and second pages, only the images of the planes from which abnormality has been detected are printed on the sheet. As such, since unnecessary planes are not printed by the recovery printing for the second page, the effect of reducing the consumption of toner used in the printer 500 is obtained.

Second Example of Recovery Printing

Next, a method in a case in which recovery printing is performed for sheets including the number of extra planes will be described.

In some cases, the image print on the sheet by recovery printing is not necessarily the normal image. In this case, recovery printing needs to be performed again to obtain the normal image, which is troublesome. Therefore, in the second example of the recovery printing, extra number of planes greater than the number of abnormal planes are printed.

Figure 21:
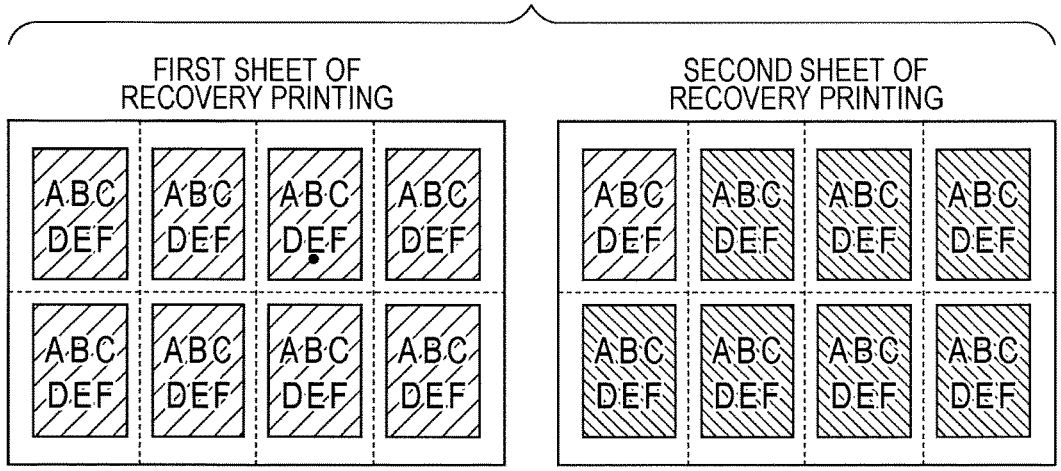
FIG. 21 is a diagram illustrating an example of imposition in a case in which recovery printing is performed in the repeat mode in the embodiment of the present invention.

FIG. 21 is a diagram illustrating an example of imposition in a case in which recovery printing is performed in the repeat mode.

For example, as illustrated in FIG. 13B, the number of divisions in the main scanning direction designated by the job information T1 is "2" and the number of divisions in the sub-scanning direction designated by the job information T1 is "4" for the sheet printed in the repeat mode. Therefore, the total number of images which are the units of cutting is "8". In a case in which the calculated total number of abnormal planes represented by the units of cutting in the first to ninth copies is 9 as illustrated in FIG. 13A, recovery printing is performed by printing images on two sheets.

Here, in recovery printing for the first sheet, eight planes are printed on the sheet. In recovery printing for the second sheet, eight planes are printed on the sheet. For the sheets subjected to the recovery printing, the images corresponding to eight planes in the first sheet and the image corresponding to only the upper left plane in the second sheet are equal to the number of abnormal planes. However, the image former 128 prints images of eight planes which are the maximum number of planes on the second sheet using recovery printing. Therefore, for example, extra images of seven planes are printed on the second sheet. In FIG. 21, the extra printed images of seven planes are hatched in a direction different from the direction in which the upper left plane is hatched so as to be highlighted.

In a case in which abnormality is detected from the sheet subjected to the recovery printing and the number of planes in which abnormality has occurred is "1", the number of planes "1" in which abnormality has occurred due to the recovery printing is less than the number of images "7" of seven normally printed planes. Therefore, it is possible to replace the abnormal image with the normal image of the sheet subjected to the recovery printing, without performing the recovery printing again. As such, the configuration in which images of extra planes are printed by recovery printing makes it possible to obtain the effect of acquiring the normal image, without performing the recovery printing again, even in a case in which some of the images printed by the recovery printing are determined to be the abnormal images.

Paper Discharge Destination Switching Method

Next, a method for switching the paper discharge destination of the sheet from which abnormality has been detected will be described.

Figure 22:
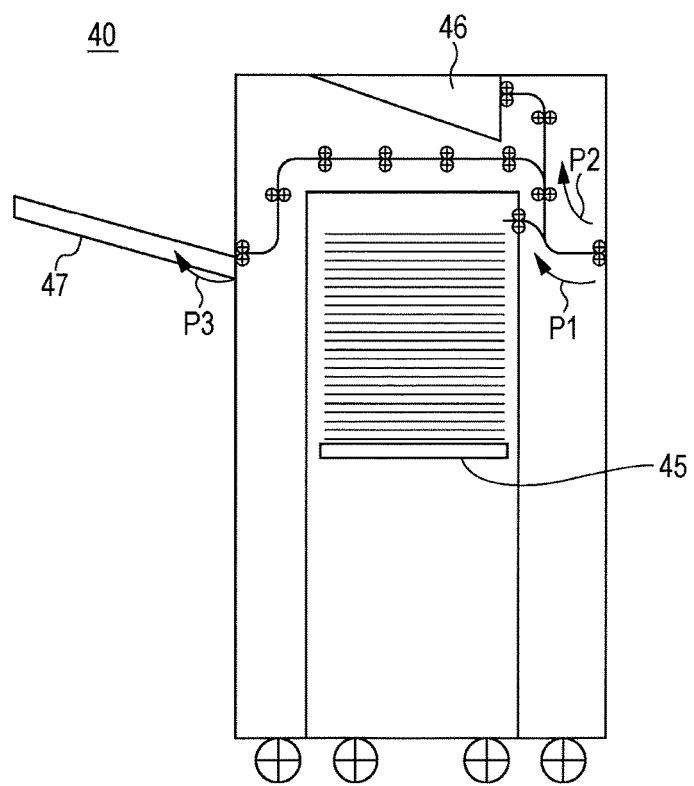
FIG. 22 is a diagram schematically illustrating an example of the internal configuration of a post-processing device according to the embodiment of the present invention.

FIG. 22 is a diagram schematically illustrating an example of the internal configuration of the post-processor 40.

The post-processor 40 includes the normal paper discharge tray 45, the paper discharge tray 46 for an entirely abnormal sheet, and the paper discharge tray 47 for a partially abnormal sheet in addition to a post-processing mechanism (not illustrated). The paper discharge destination switch 127 switches the paper discharge destination of the sheet transported to the post-processor 40 in response to a command from the controller 122 illustrated in FIG. 6.

In a case in which the image inspector 126 determines that all planes have been normally printed on a sheet, the sheet is discharged to the normal paper discharge tray 45 through a path P1 illustrated in FIG. 22. Therefore, in a case in which all of the planes on the sheet are normal, the controller 122 instructs the paper discharge destination switch 127 to change the paper discharge destination of the sheet to the normal paper discharge tray 45.

In contrast, the entirely abnormal sheet (waste sheet) in which abnormality has been detected from all of the planes is not usable. As such, in a case in which the image inspector 126 determines that all of the planes on the sheet are abnormal, the controller 122 instructs the paper discharge destination switch 127 to change the paper discharge destination to the paper discharge tray 46 for an entirely abnormal sheet. The entirely abnormal sheet (waste sheet) is distinguished from the normally printed sheet and is discharged to the paper discharge tray 46 for an entirely abnormal sheet through a path P2 illustrated in FIG. 22.

A partially abnormal sheet including at least one plane in which the normal image has been printed among a plurality of planes of the sheet is cut and only the plane in which the image has normally printed is used. In a case in which the image inspection results of the image inspector 126 show that, in a case in which some planes are abnormal, the controller 122 instructs the paper discharge destination switch 127 to change the paper discharge destination to the paper discharge tray 47 for a partially abnormal sheet. Therefore, the partially abnormal sheet is distinguished from the entirely abnormal sheet. Only the partially abnormal sheet is discharged to the paper discharge tray 47 for a partially abnormal sheet through a path P3.

The paper discharge destinations of the sheet in which all planes have been normally printed, the entirely abnormal sheet in which abnormality has been detected from all planes, and the partially abnormal sheet in which abnormality has been detected from a portion are separated from each other. Therefore, the effect of reducing a burden on the complicated sorting operation of the user is obtained.

In this embodiment, the post-processor 40 has three or more paper discharge destinations illustrated in FIG. 22. However, a plurality of paper discharge devices may be connected to the image forming apparatus 1 and the paper discharge destinations may be separated so as to correspond to the paper discharge devices.

In some cases, a plurality of paper discharge destinations is not provided in the post-processor 40. In this case, the normally printed sheet and the entirely abnormal sheet or the partially abnormal sheet are discharged to the same paper discharge tray. However, information indicating what number the entirely abnormal sheet or the partially abnormal sheet is in the discharge order after the normally printed sheet is notified to the operation display 400 or the information terminal 50. For example, the notification may be performed by discharging a sheet having information printed thereon onto the top of a bundle of sheets stacked on the paper discharge tray after the printing of the number of sheets designated by a job is completed. In this case, the user can rapidly extract and exclude the entirely abnormal sheet or the partially abnormal sheet from the normally printed sheets.

Charging Method

In some cases, a fee is charged for the sheet that has been printed and discharged by the image forming apparatus 1. In general, a predetermined fee is charged for the sheet that has been normally printed and discharged and no fee is charged for the sheet from which abnormality has been detected. In a case in which the normal image and the abnormal image are mixed in one sheet as in the partially abnormal sheet, the controller 122 determines a fee on the basis of the ratio of the number of normally printed planes to the number of printed planes. For example, in case in which a charge for one sheet is A, eight planes are printed, and four planes are normally printed, the controller 122 calculates a charge as follows: charge=(4/8)×A. Then, the controller 122 calculates a charge for all of the discharged sheets. Therefore, the controller 122 can calculate a charge for all of the sheets considering only the normally printed planes.

Example of Additional Information Printed

Next, the additional information printed on the sheet will be described.

Figure 23A:
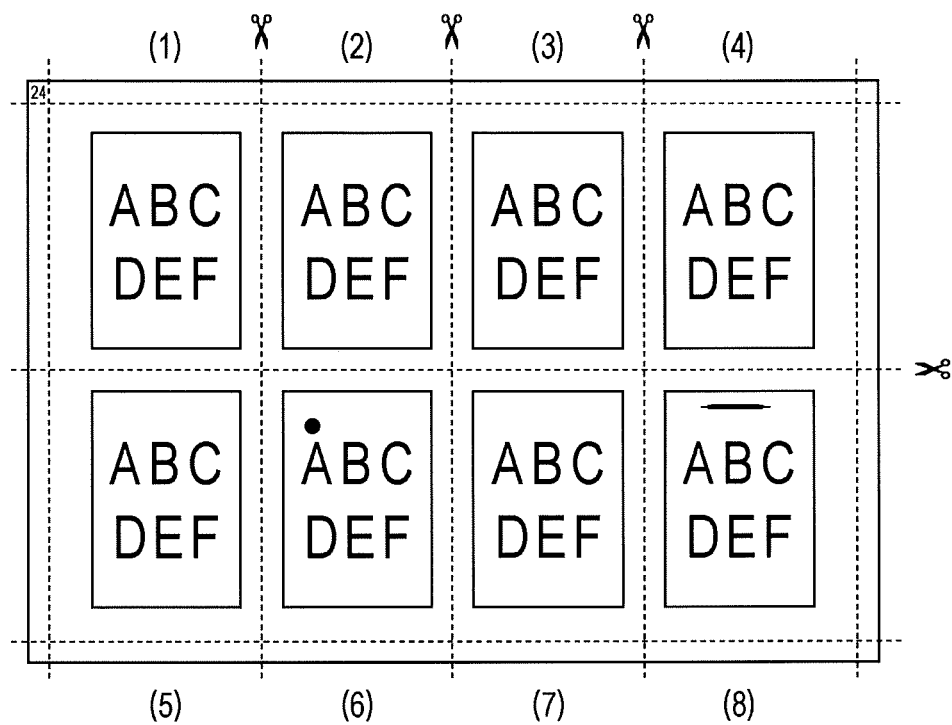
FIGS. 23A and 23B are diagrams illustrating an example of additional information printed on a printed sheet in the embodiment of the present invention.
Figure 23B:
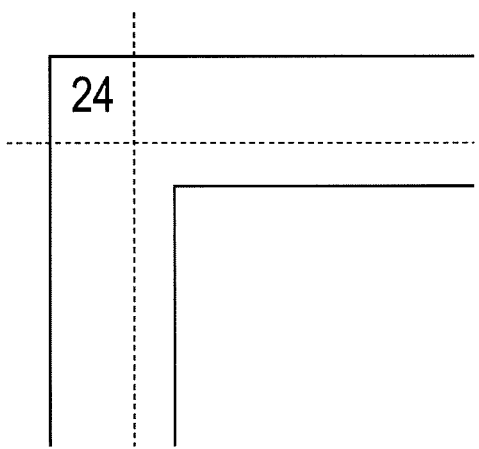

FIGS. 23A and 23B are diagrams illustrating an example of the additional information printed on the printed sheet. FIG. 23A illustrates an example of the additional information printed on the sheet printed in the repeat mode and FIG. 23B illustrates an example in which a portion to which the additional information is added is enlarged.

The image former 128 prints the additional information in the margin of the printed sheet. The margin of the sheet is a portion that is cut after the sheet is printed. The additional information is printed in the margin so as not to have an effect on the image printed on the sheet. Examples of the additional information include a copy number, a page number, and consecutive numbers. The additional information is formed by the additional information former 124 as illustrated in FIG. 6.

In a case in which the image inspector 126 detects abnormality in the sheet from the read image, the notifier 123 notifies the operation display 400 or the information terminal 50 of additional information indicating the position of the abnormality. For example, in FIG. 23B, "24" displayed at the upper left corner of the sheet indicates that the sheet is the twenty-fourth copy. Therefore, the notifier 123 notifies the operation display 400 or the information terminal 50 that abnormality has occurred in plane numbers (6) and (8) of the twenty-fourth copy. The user can easily find the sheet, from which abnormality has been detected, from the discharged sheets on the basis of the notified content. In addition, the user easily determines which plane of the found sheet is usable.

Example of Additional Information Displayed

FIG. 24 is a diagram illustrating an example of the additional information combined with the read image.

In a case in which abnormality is detected from the read image read by the image reader 129 in image inspection, the read image is stored in the storage 125 and is read by the controller 122. Then, the additional information formed by the additional information former 124 is combined with the image read from the storage 125. In this case, the combined additional information is represented by, for example, the mark X3 that surrounds the abnormality X1 in plane number (6) and the mark X4 that surrounds the abnormality X2 in plane number (8) of the sheet illustrated in FIG. 24. Then, the image with which the additional information has been combined is transmitted to the operation display 400 or the information terminal 50. Therefore, even in a case in which the additional information is not printed on the sheet, the user can recognize a portion of the sheet from which abnormality has been detected, on the basis of the image displayed on the operation display 400 or the information terminal 50.

Example of Process in Case in Which Controller Part Performs Imposition

Next, the flow of a process from the input of images to the discharge of a sheet in a case in which the controller part 600 imposes the images will be described with reference to FIGS. 25 to 27.

Figure 25:
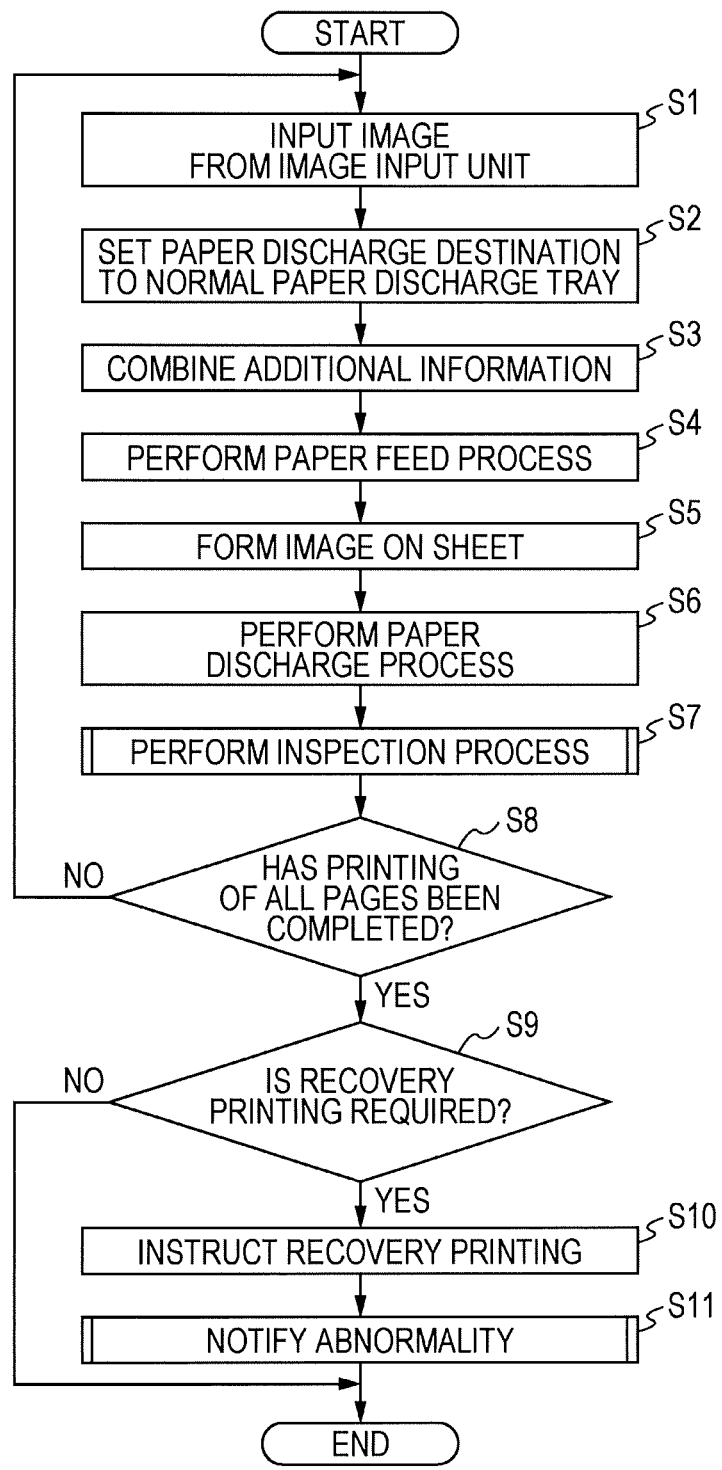
FIG. 25 is a main flowchart illustrating an example of a process performed by the image forming apparatus in a case in which a controller part performs the imposition of images in the embodiment of the present invention.

FIG. 25 is a flowchart illustrating an example of the process performed by the image forming apparatus 1 in a case in which the controller part 600 imposes images. This process is performed according to an example of the operation of each unit illustrated in FIG. 6.

First, an image is input from the image input unit 121 to the controller 122 (S1). The image is received from the controller part 600 by the image input unit 121. Then, the controller 122 starts a job. In a case in which the job starts, the controller 122 compresses the image input from the image input unit 121 with the compression IC 108 and stores the compressed image in the compression memory 111. Then, the controller 122 decompresses the compressed image stored in the compression memory 111 with the decompression IC 109 and stores the decompressed image in the first page memory 112a.

Then, the paper discharge destination switch 127 sets the paper discharge destination to the normal paper discharge tray 45 in response to a command from the controller 122 (S2). Then, the controller 122 instructs the additional information former 124 to form additional information. The additional information former 124 generates additional information which is different identifiers for each sheet and combines the additional information with the input image stored in the first page memory 112a (S3).

Then, a paper feed process of feeding a sheet from the paper feed tray to the image former 128 is performed (S4). Then, the controller 122 instructs the image former 128 to output an image and the image former 128 performs a process of forming an image on the sheet (S5). Then, after the discharge of the sheet is completed, the image former 128 notifies the controller 122 that the discharge of the sheet has been completed (S6).

Then, the image inspector 126 performs an image inspection process (S7). Here, the image inspection process will be described.

Figure 26:
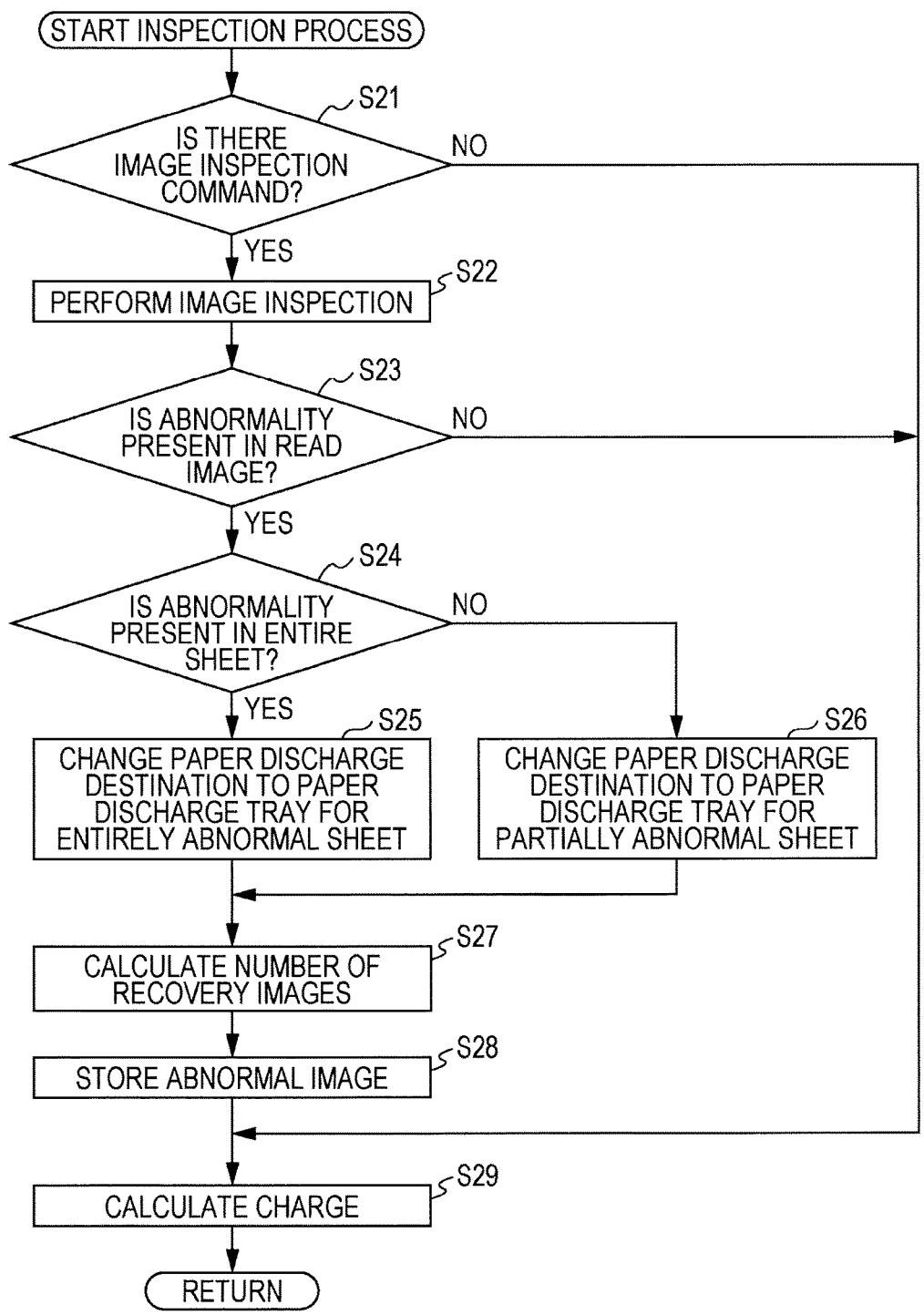
FIG. 26 is a flowchart illustrating an example of an image inspection process according to the embodiment of the present invention.

FIG. 26 is a flowchart illustrating an example of the image inspection process.

First, the controller 122 determines whether an image inspection command is issued (S21). Whether an image inspection command is issued is determined on the basis of, for example, the job information T1. In a case in which no image inspection commands are issued (NO in S21), the process proceeds to Step S29 in which a charge is calculated.

On the other hand, in a case in which an image inspection command is issued (YES in S21), the controller 122 instructs the image reader 129 to read an image. The image reader 129 reads the printed sheet, stores the read image in the second page memory 112*b*, and notifies the controller 122 that reading has been completed. The controller 122 instructs the image inspector 126 to inspect an image (S22).

The image inspector 126 inspects whether abnormality is present in the read image of the printed sheet for each unit of inspection (S23). In a case in which abnormality is absent in the read image (NO in S23), the process proceeds to Step S29 in which a charge is calculated. On the other hand, in a case in which abnormality is present in the read image (YES in S23), the image inspector 126 notifies the controller 122 of the portion (plane) in which abnormality has been detected.

Then, the controller 122 determines whether abnormality is present in the entire sheet (S24). In a case in which abnormality is present in the entire sheet (YES in S24), the controller 122 instructs the paper discharge destination switch 127 to change the paper discharge destination of the sheet to the paper discharge tray 46 for an entirely abnormal sheet (S25). On the other hand, in a case in which abnormality is not present in the entire sheet, that is, abnormality has been detected from only some planes (NO in S24), the controller 122 instructs the paper discharge destination switch 127 to change the paper discharge destination of the sheet to the paper discharge tray 47 for a partially abnormal sheet (S26).

After Step S25 or Step S26, the controller 122 calculates the number of recovery planes from the number of abnormal planes calculated for each unit of cutting (S27). Then, the controller 122 stores the abnormal image of the sheet, from which abnormality has been detected, in the storage 125 (S28).

After NO in Step S21, NO in S23, or Step S28, the controller 122 calculates a charge on the basis of the number of abnormal planes calculated for each unit of cutting (S29) and returns Step S8 in FIG. 25.

Next, the description continues with reference to FIG. 25.

After the inspection process in Step S7, the controller 122 determines whether the printing of all of the pages designated by the job has been completed (S8). In a case in which it is determined that the printing of all of the pages has not been completed (NO in S8), the controller 122 returns to Step S1 and continuously performs the process.

On the other hand, in a case in which it is determined that the printing of all of the pages has been completed (YES in S8), the controller 122 determines whether recovery printing is required from the inspection results of the images (S9). In a case in which it is determined that recovery printing is not required (NO in S9), the controller 122 ends this process.

On the other hand, in a case in which it is determined that recovery printing is required (YES in S9), the controller 122 notifies the controller part 600 of the number of recovery planes and the information of the image to be recovered and instructs the controller part 600 to perform recovery printing (S10). Then, the controller 122 performs the abnormality notification process illustrated in FIGS. 23A and 23B or FIG. 24 (S11) and ends this process. Then, in a case in which recovery printing is performed, the process starts again from Step S1.

Here, the abnormality notification process in Step S11 will be described.

Figure 27:
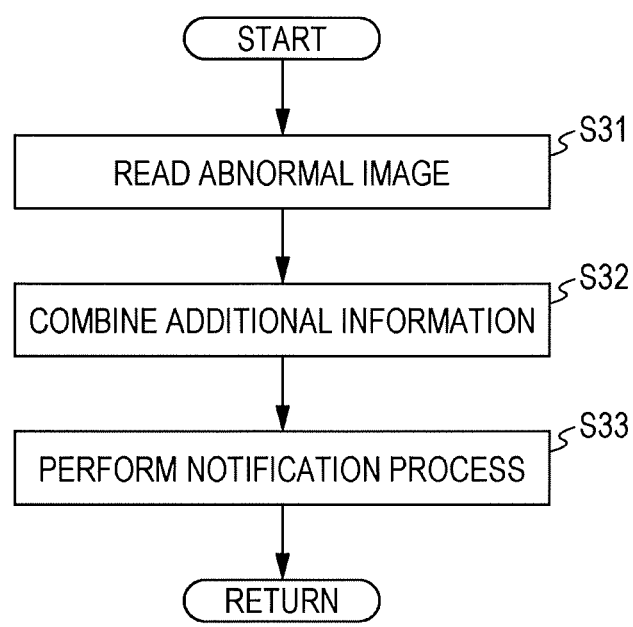
FIG. 27 is a flowchart illustrating an example of an abnormality notification process according to the embodiment of the present invention.

FIG. 27 is a flowchart illustrating an example of the abnormality notification process.

First, the controller 122 reads the abnormal image of the sheet, from which abnormality has been detected by the image inspector 126, from the second page memory 112*b* (S31). Then, the controller 122 instructs the additional information former 124 to form additional information for indicating an abnormal portion. The additional information former 124 forms additional information and combines the additional information with the read image of the sheet, from which abnormality has been detected, in the second page memory 112*b* (S32).

Then, the controller 122 instructs the notifier 123 to notify abnormality. The notifier 123 notifies the operation display 400 or the information terminal 50 what number the sheet including both the abnormal image and the normal image is in the discharge order and of a composite image in which a mark indicating an abnormality detection portion has been combined with the abnormal image (S33).

Example of Process in Case in which Image Forming Apparatus Performs Imposition

Next, the flow of a process from the input of images to the discharge of a sheet in a case in which the image forming apparatus 1 imposes the images will be described with reference to FIG. 28.

Figure 28:
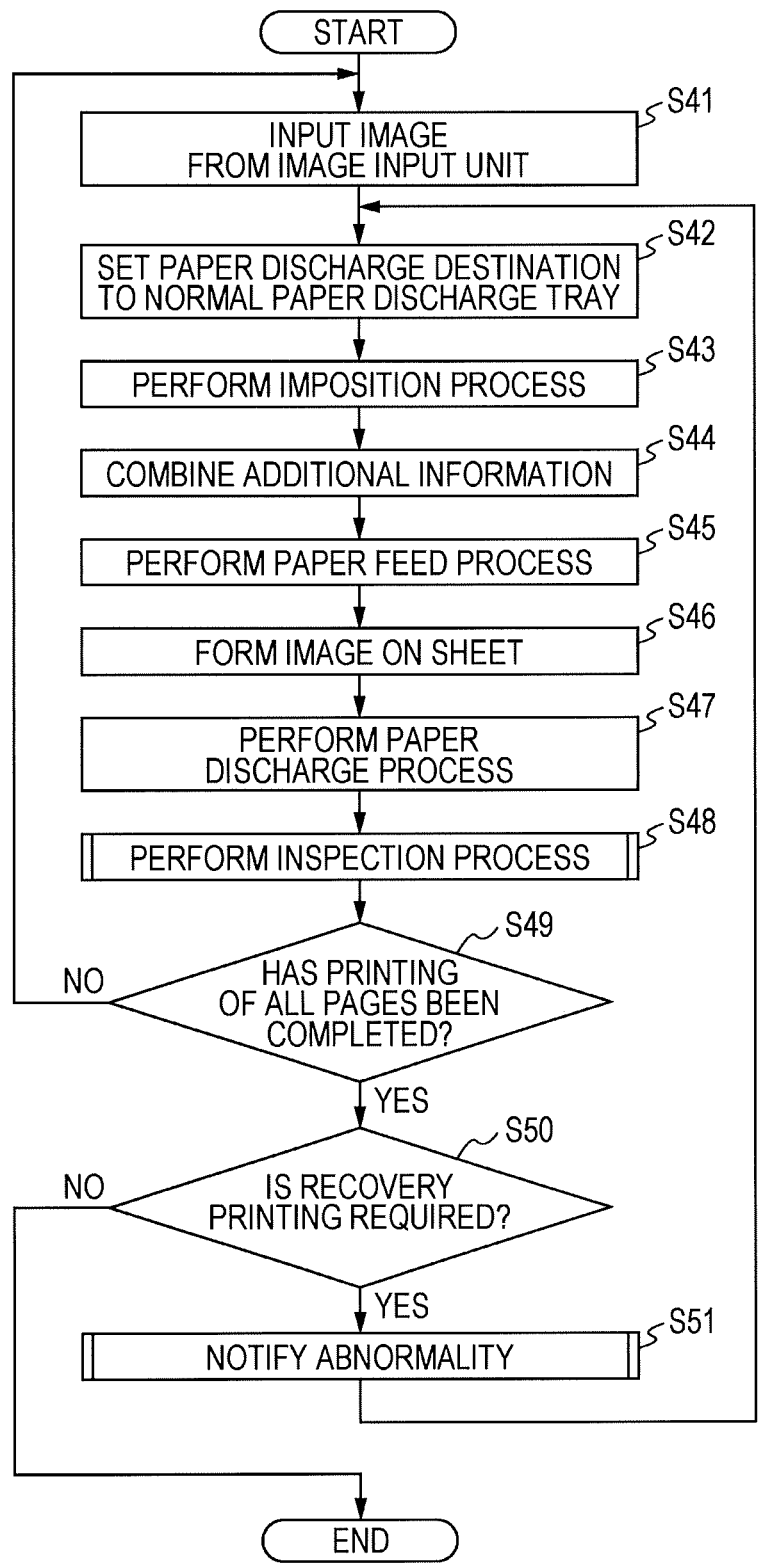
FIG. 28 is a main flowchart illustrating an example of a process performed by the image forming apparatus in a case in which the image forming apparatus performs the imposition of images in the embodiment of the present invention.

FIG. 28 is a flowchart illustrating an example of the process performed by the image forming apparatus 1 in a case in which the image forming apparatus 1 imposes images. This process is performed according to an example of the operation of each unit illustrated in FIG. 6. Since the process illustrated in FIG. 28 is the same as the process illustrated in FIG. 25, a difference between the processes will be described.

First, in a case in which an image is input from the image input unit 121 to the controller 122 (S41), the paper discharge destination switch 127 sets the paper discharge destination to the normal paper discharge tray 45 in response to a command from the controller 122 (S42). The process in Steps S41 and S42 is the same as that in Steps S1 and S2 illustrated in FIG. 25.

Then, the controller 122 imposes the image input from the image input unit 121 on the basis of the number of images imposed in the main scanning direction and the number of images imposed in the sub-scanning direction which are designated by the job information T2 included in the received job (S43). Then, the controller 122 performs the subsequent process. Here, since the process from Step S44 to Step S49 is the same as that from Step S3 to Step S8 illustrated in FIG. 25, the detailed description thereof will not be repeated.

In a case in which it is determined in Step S49 that the printing of all of the pages has been completed (YES in S49), the controller 122 determines whether recovery printing is required from the inspection results of the images (S50). In a case in which it is determined that recovery printing is not required (NO in S50), the controller 122 ends this process.

On the other hand, in a case in which it is determined that recovery printing is required (YES in S50), the controller 122 performs the abnormality notification process illustrated in FIGS. 23A and 23B or FIG. 24 (S51) and returns to Step S42 again. Then, the controller 122 sets the paper discharge destination to the normal paper discharge tray 45 (S42) and imposes the image on the sheet on the basis of the number of recovery planes and the information of the image to be recovered (S43). Then, the controller 122 controls the execution of recovery printing in the subsequent process.

In the image forming apparatus 1 according to the above-described embodiment, the inspection result of determining the normal image and the abnormal image in a predetermined unit of inspection is obtained from a plurality of images imposed on the printed sheet. In the related art, in a case in which a portion of the sheet is determined to be abnormal, the entire sheet is regarded as the waste sheet and is removed. However, in this embodiment, even in a case in which abnormality is present in a portion of the sheet, the normal image and the abnormal image are determined for each unit of inspection. Therefore, the unit of inspection determined to be the normal image can be cut from the sheet and can be reused. As a result, it is possible to reduce the generation of the waste sheet. In addition, recovery printing is performed according to the number of planes determined to be the abnormal images. Therefore, it is possible to prevent the execution of recovery printing more than necessary and the consumption of supplies such as toner.

In addition, recovery printing is performed according to the number of planes of the abnormal images obtained by integrating the number of planes of the abnormal images included in the printed sheet for each unit of cutting of the printed sheet. Therefore, it is possible to reduce unnecessary recovery printing.

In a case in which there is only one paper discharge destination, the sheet including both the abnormal image and the normal image is discharged to the same paper discharge destination as that of the normally printed sheet. In this case, the notifier 123 notifies what number the sheet including both the abnormal image and the normal image is in the discharge order. Therefore, the user can rapidly acquire the sheet including both the abnormal image and the normal image.

It is possible to discharge the waste sheet and the sheet including both the abnormal image and the normal image while switching the paper discharge destination. Therefore, the user can acquire the sheet including both the abnormal image and the normal image from the notified paper discharge destination and reuse the normal image printed on the sheet.

The additional information is formed in the printed sheet. In a case in which it is determined that one or more abnormal images are included in the printed sheet, the additional information and the position of the abnormal images are notified. The user can immediately recognize the position of the abnormal images from the sheet including both the abnormal image and the normal image. In a case in which one or more abnormal images are included in the printed sheet, the read image with which the abnormality additional information has been combined is notified. Therefore, the user easily recognizes in which printed sheet abnormality has occurred.

Furthermore, it is possible to reuse the normal image from the sheet including both the abnormal image and the normal image and to determine a charge for each unit of cutting including the normal image. Therefore, it is possible to effectively determine a charge, as compared to the related art in which charging is not performed due to abnormality in a portion of the printed sheet even in a case in which the normal image is included in the printed sheet.

In the above-described embodiment, the example in which the reader 30 is connected in line to the main body 10 of the image forming apparatus 1 has been described. However, an inspection device corresponding to the reader 30 may be provided separately from the main body 10. The inspection device is configured so as to include the image reader 129 and the image inspector 126 incorporated into the image forming apparatus 1. The inspection device includes a controller that can perform some of the functions of the controller 122. The controller can control the operation of each unit of the inspection device. In addition, the inspection device may include the notifier 123 and the additional information former 124. The controller of the inspection device may transmit the examined image having the additional information combined therewith to the image forming apparatus or the information terminal 50 to notify the user of the occurrence of abnormality.

The present invention is not limited to the above-described embodiment and various applications and modifications of the present invention can be made without departing from the scope and spirit of the present invention described in the claims.

For example, the above-described embodiment describes the configuration of the apparatus and the system in detail and concretely such that the present invention is easily understood and is not necessarily limited to the apparatus and the system provided with all of the above-described configurations. Further, for some of the configurations of the embodiment, other configurations may be added, deleted, and replaced.

In addition, control lines or information lines indicate components that are considered to be necessary for explanation and do not necessarily indicate all control lines and information lines required for a product. In practice, it may be considered that almost all configurations are connected to each other.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:
   a hardware processor;
   an image former that outputs a printed sheet obtained by forming a plurality of imposed images on a sheet in response to a command from the hardware processor; and
   an image reader that reads the printed sheet and outputs a plurality of read images in response to a command from the hardware processor, wherein
   the hardware processor performs, in response to a command from the hardware processor, an inspection process of comparing, for each of a plurality of predetermined units of inspection, a reference image for the predetermined unit of inspection with a read image selected from the plurality of read images on the basis of the predetermined unit of inspection, and obtains an inspection result in which the read image selected from the plurality of read images which is matched with the reference image is determined to be a normal image and the read image selected from the plurality of read images which is not matched with the reference image is determined to be an abnormal image, and a determination process of determining whether a sheet, in which abnormality is detected from at least one of the imposed images, is a sheet in which abnormality has been detected from all of the imposed images, or a sheet in which abnormality has been detected from less than all of the imposed images.

2. The image forming apparatus according to claim 1, wherein
   in a case in which a command to cut the printed sheet is issued and the number of divisions of the printed sheet by cutting is designated, the hardware processor determines the normal image and the abnormal image included in the plurality of images imposed on the printed sheet, using a unit of cutting of the printed sheet calculated from the number of divisions as the unit of inspection.

3. The image forming apparatus according to claim 1, wherein
the hardware processor integrates the number of planes of the abnormal images in the printed sheet determined by the hardware processor for each unit of cutting of the printed sheet and instructs the image former to perform recovery printing corresponding to the integrated number of planes of the abnormal images.

4. The image forming apparatus according to claim 3, wherein
the hardware processor calculates the number of sheets required for the recovery printing on the basis of the number of planes of the abnormal images in the printed sheet determined by the hardware processor and instructs the image former to perform the recovery printing to print only the number of planes of the abnormal images on the calculated number of sheets.

5. The image forming apparatus according to claim 3, wherein
the hardware processor calculates the number of sheets required for the recovery printing on the basis of the number of planes of the abnormal images in the printed sheet determined by the hardware processor and instructs the image former to perform the recovery printing to print the maximum number of planes capable of being formed on the calculated number of sheets.

6. The image forming apparatus according to claim 1, further comprising
a notifier that, in a case in which the sheet including both the abnormal image and the normal image is discharged to the same paper discharge destination as that of a normally printed sheet, notifies what number the sheet including both the abnormal image and the normal image is in a discharge order, in response to a command from the hardware processor.

7. The image forming apparatus according to claim 1, further comprising
a paper discharge destination switch that switches the paper discharge destination of the sheet in response to a command from the hardware processor, wherein
the hardware processor determines the sheet, in which abnormality has been detected from all of the imposed images, to be a waste sheet, and
the hardware processor instructs the paper discharge destination switch to switch the paper discharge destinations of a normally printed sheet, the waste sheet, the sheet including both the abnormal image and the normal image.

8. The image forming apparatus according to claim 7, further comprising
a notifier that notifies the paper discharge destinations of the waste sheet and the sheet including both the abnormal image and the normal image which are discharged to the paper discharge destinations switched by the paper discharge destination switch.

9. The image forming apparatus according to claim 6, wherein
the hardware processor forms additional information related to the sheet in response to a command from the hardware processor,
the hardware processor instructs the image former to form an image with the additional information inserted in a margin of the sheet, and
in a case in which the hardware processor determines that one or more abnormal images are included in the printed sheet, the hardware processor instructs the notifier to notify the additional information formed on the printed sheet and a position of the abnormal image in the printed sheet.

10. The image forming apparatus according to claim 9, wherein
the hardware processor stores the plurality of read images,
in a case in which the hardware processor determines that one or more abnormal images are included in the printed sheet, the hardware processor combines abnormality additional information indicating content of the abnormal image with a portion in which the abnormal image is determined to be included in a read image of the plurality of read images read from the hardware processor, and
the hardware processor instructs the notifier to notify the read image of the plurality of read images with which the abnormality additional information has been combined.

11. The image forming apparatus according to claim 1, wherein
in a case in which all of the images included in a unit of cutting of the printed sheet are the normal images, the hardware processor determines a charge for each unit of cutting of the printed sheet.

12. An inspection device comprising:
a hardware processor; and
an image reader that reads a printed sheet obtained by forming a plurality of imposed images on a sheet and outputs read images in response to a command from the hardware processor, wherein
the hardware processor performs, in response to a command from the hardware processor, an inspection process of comparing, for each of a plurality of predetermined units of inspection, a reference image for the predetermined unit of inspection with a read image selected from the plurality of read images on the basis of the predetermined unit of inspection, and obtains an inspection result in which the read image selected from the plurality of read images which is matched with the reference image is determined to be a normal image and the read image selected from the plurality of read images which is not matched with the reference image is determined to be an abnormal image, and a determination process of determining whether a sheet, in which abnormality is detected from at least one of the imposed images, is a sheet in which abnormality has been detected from all of the imposed images, or a sheet in which abnormality has been detected from less than all of the imposed images.

13. A non-transitory recording medium storing a computer readable inspection program causing a computer to perform:
reading a printed sheet obtained by forming a plurality of imposed images on a sheet and outputting read images; and
performing an inspection process of comparing, for each of a plurality of predetermined units of inspection, a reference image for the predetermined unit of inspection with a read image selected from the plurality of read images on the basis of the predetermined unit of inspection, and obtains an inspection result in which the read image selected from the plurality of read images which is matched with the reference image is determined to be a normal image and the read image selected from the plurality of read images which is not matched with the reference image is determined to be an abnormal image, and a determination process of determining whether a sheet, in which abnormality is detected from at least one of the imposed images, is a sheet in which abnormality has been detected from all of the imposed images, or a sheet in which abnormality has been detected from less than all of the imposed images.

14. The image forming apparatus according to claim 1, wherein sheets in which abnormality has been detected from all of the imposed images and sheets in which abnormality has been detected from less than all of the imposed images are distinguished from each other by notification to a user or by being discharged to different areas.

15. The inspection device according to claim 12, wherein sheets in which abnormality has been detected from all of the imposed images and sheets in which abnormality has been detected from less than all of the imposed images are distinguished from each other by notification to a user or by being discharged to different areas.

16. The non-transitory recording medium according to claim 13, wherein sheets in which abnormality has been detected from all of the imposed images and sheets in which abnormality has been detected from less than all of the imposed images are distinguished from each other by notification to a user or by being discharged to different areas.

* * * * *